(12) United States Patent
Kabelac

(10) Patent No.: US 7,957,089 B2
(45) Date of Patent: Jun. 7, 2011

(54) SERVO PATTERN ARCHITECTURE AND METHOD USING SAME TO IMPROVE LPOS ENCODING EFFICIENCY

(75) Inventor: William John Kabelac, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/134,094

(22) Filed: Jun. 5, 2008

(65) Prior Publication Data

US 2009/0303635 A1   Dec. 10, 2009

(51) Int. Cl.
*G11B 5/584* (2006.01)
(52) U.S. Cl. .................................................. 360/77.12
(58) Field of Classification Search ............... 360/77.08, 360/77.12, 77.01, 77.05, 78.02, 134
See application file for complete search history.

(56) References Cited

U.S. PATENT DOCUMENTS

| | | | |
|---|---|---|---|
| 5,930,065 A | 7/1999 | Albrecht et al. | |
| 6,754,034 B2 | 6/2004 | Cumpson | |
| 7,102,846 B2 | 9/2006 | Bui et al. | |
| 7,139,151 B2 | 11/2006 | Johnson et al. | |
| 2007/0097537 A1 | 5/2007 | Hoerger et al. | |
| 2009/0237832 A1* | 9/2009 | Cherubini et al. | 360/77.08 |

* cited by examiner

*Primary Examiner* — Fred Tzeng
(74) *Attorney, Agent, or Firm* — Dale F. Regelman; Quarles & Brady LLP

(57) ABSTRACT

A sequential data storage medium, such as for example and without limitation a magnetic tape, comprising a sequence of plurality of servo patterns encoded therein, which provide lateral position information and LPOS information. Each servo pattern comprises a first burst comprising a first pulse, a second pulse, a third pulse, a fourth pulse and a fifth pulse and a second burst comprising a sixth pulse, a seventh pulse, an eighth pulse, a ninth pulse and a tent pulse. The widths of the plurality of pulses, in combination with the spacings between the plurality of pulses, encode two bits of data.

8 Claims, 16 Drawing Sheets

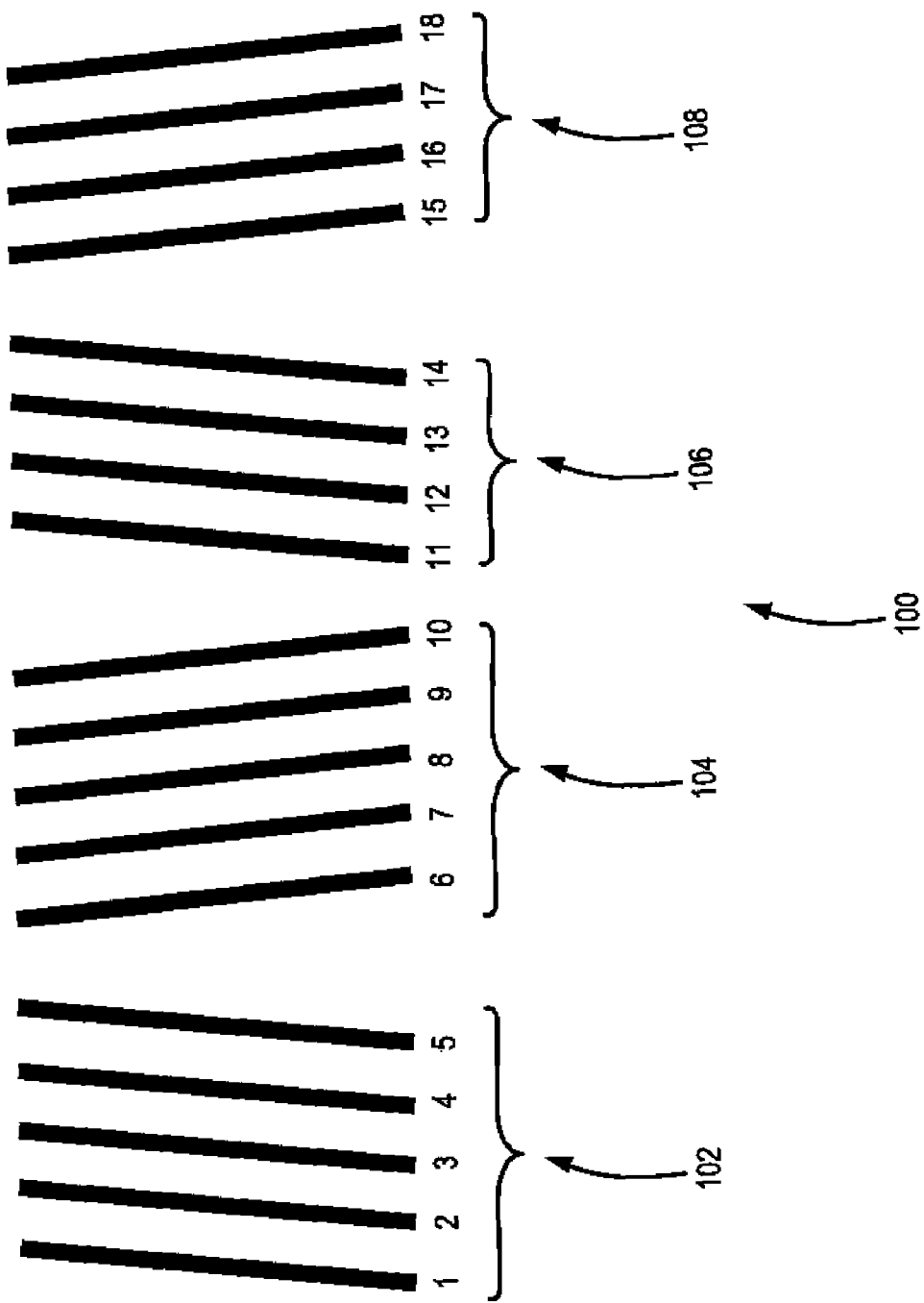

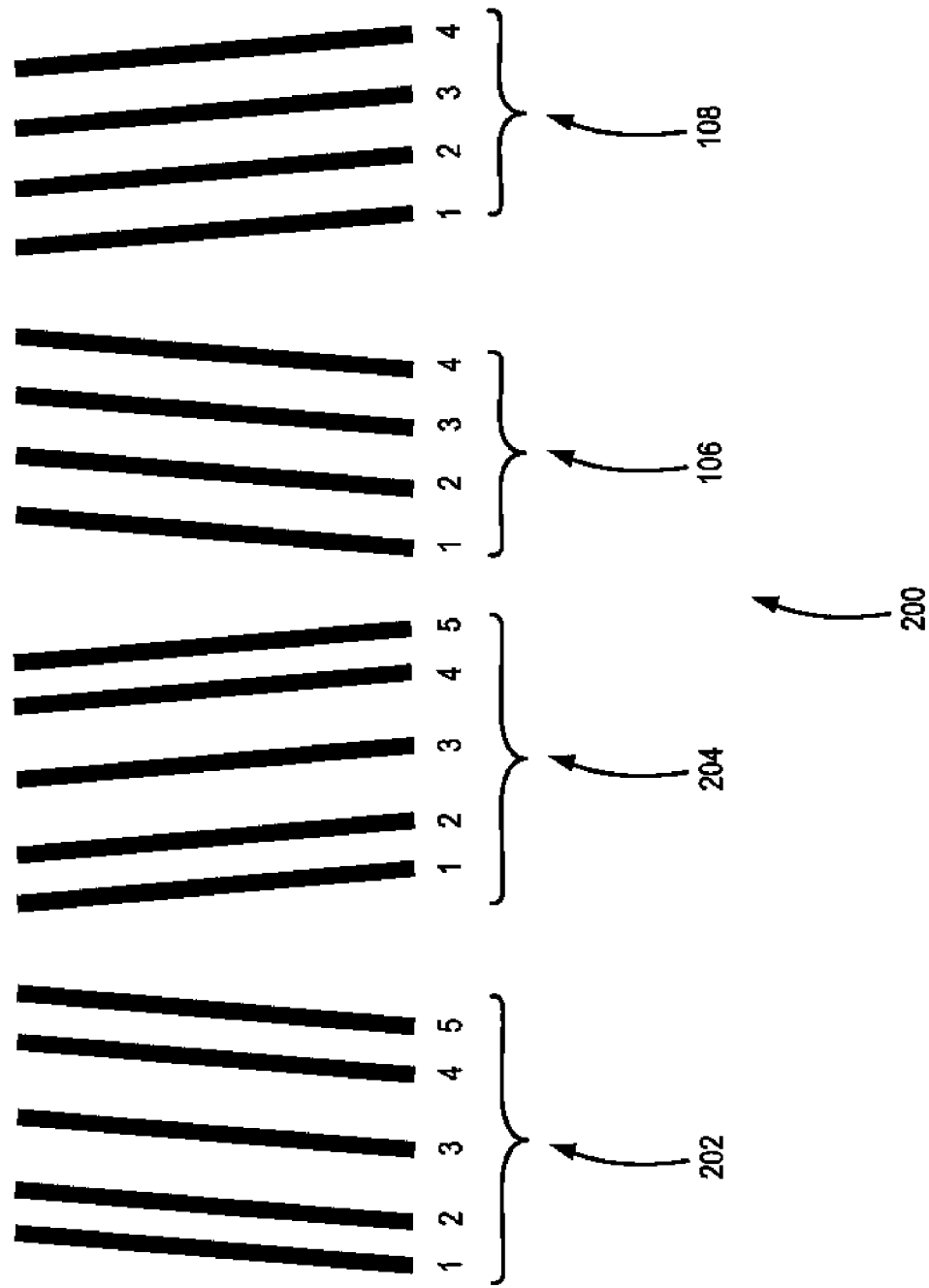

SERVO PATTERN ARCHITECTURE AND METHOD USING SAME TO IMPROVE LPOS ENCODING EFFICIENCY

FIELD OF THE INVENTION

Applicant's invention relates to servo pattern architecture, and a method using that servo pattern architecture, to improve linear position ("LPOS") encoding efficiency in a sequential storage medium, such as for example a magnetic tape.

BACKGROUND OF THE INVENTION

Timing-based servo (TBS) is a technology developed for linear tape drives. In TBS systems, recorded servo patterns consist of transitions with two different azimuthal slopes. Head position is derived from the relative timing of pulses, or dibits, generated by a narrow head reading the relatively wide servo patterns. TBS patterns also allow the encoding of additional longitudinal position (LPOS) information without affecting the generation of the transversal position error signal (PES). This is obtained by shifting transitions from their nominal pattern position using pulse-position modulation (PPM).

A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319.

Traditionally, the detection of LPOS information bits is based on the observation of the shifts of the arrival times of the dibit peaks within the servo bursts at the servo reader output. It is known in the art to encode by pulse position modulation an LPOS word comprising 36 bits of information in a non-data region of a sequential data storage medium, such as a magnetic tape. Each encoded LPOS word in the standard ECMA-319 on data interchange on 12.7 mm 384-track magnetic tape cartridges relates to a specific absolute longitudinal address, and appears every 7.2 mm down the tape. Using prior art methods, an LPOS word comprises 36 individual servo patterns, i.e. frames, wherein each frame encodes one bit of information. The LPOS values of two consecutive LPOS words differ by one. Therefore, a tape drive can position a data/servo head assembly at a specified LPOS address thereby achieving a longitudinal resolution of about 7.2 mm.

A read/write assembly comprising two servo heads spans a data band and two servo bands disposed adjacent that data band. In the event one servo head is rendered inoperative, then only one servo head can be used to laterally position the read/write head. Bit errors in the operative servo channel can cause a stop-write condition. Alternatively, a servo band may become damaged, or may not comprise useful information resulting from media damage.

SUMMARY OF THE INVENTION

Applicant's invention comprises a sequential data storage medium, such as for example and without limitation a magnetic tape, comprising a sequence of plurality of servo patterns encoded therein, which provide lateral position information and LPOS information. Each servo pattern comprises a first burst comprising a first pulse, a second pulse, a third pulse, a fourth pulse and a fifth pulse and a second burst comprising a sixth pulse, a seventh pulse, an eighth pulse, a ninth pulse and a tenth pulse. The widths of the plurality of pulses comprising the first burst and the second burst, in combination with the spacings between those pulses, encode two bits of data.

In certain embodiments, each servo pattern further comprises a third burst comprising an eleventh pulse, a twelfth pulse, a thirteenth pulse, and a fourteenth pulse, and a fourth burst comprising a fifteenth pulse, a sixteenth pulse, a seventeenth pulse, and an eighteenth pulse. The widths of the plurality of pulses comprising the third burst and the fourth burst, in combination with the spacings between the plurality of pulses comprising the third burst and the fourth burst, encode one bit of data.

Applicant's invention further comprises a method to encode information in a non-data region of Applicant's sequential data storage medium using Applicant's servo pattern architecture. In certain embodiments, Applicant's method provides higher reliability of detection of information and lower decoding latency as compared to prior art approaches.

In certain embodiments, Applicant's method utilizes servo patterns comprising prior art Subframe 1 architecture in combination with Applicant's Subframe 2 architecture to encode 1 bit of information in each servo pattern. In certain embodiments, Applicant's method utilizes servo patterns comprising Applicant's Subframe 1 architecture in combination with prior art Subframe 2 architecture to encode 2 bits of information in each servo pattern. In certain embodiments, Applicant's method utilizes servo patterns comprising Applicant's Subframe 1 architecture in combination with Applicant's Subframe 2 architecture to encode 3 bits of information in each servo pattern.

BRIEF DESCRIPTION OF THE DRAWINGS

The invention will be better understood from a reading of the following detailed description taken in conjunction with the drawings in which like reference designators are used to designate like elements, and in which:

FIG. 1A illustrates a servo pattern comprising four bursts, wherein each of those four bursts comprises a plurality of pulses;

FIG. 2A illustrates a first prior art servo pattern used to encode a single bit of information;

DETAILED DESCRIPTION OF THE PREFERRED EMBODIMENTS

Figure 1B:
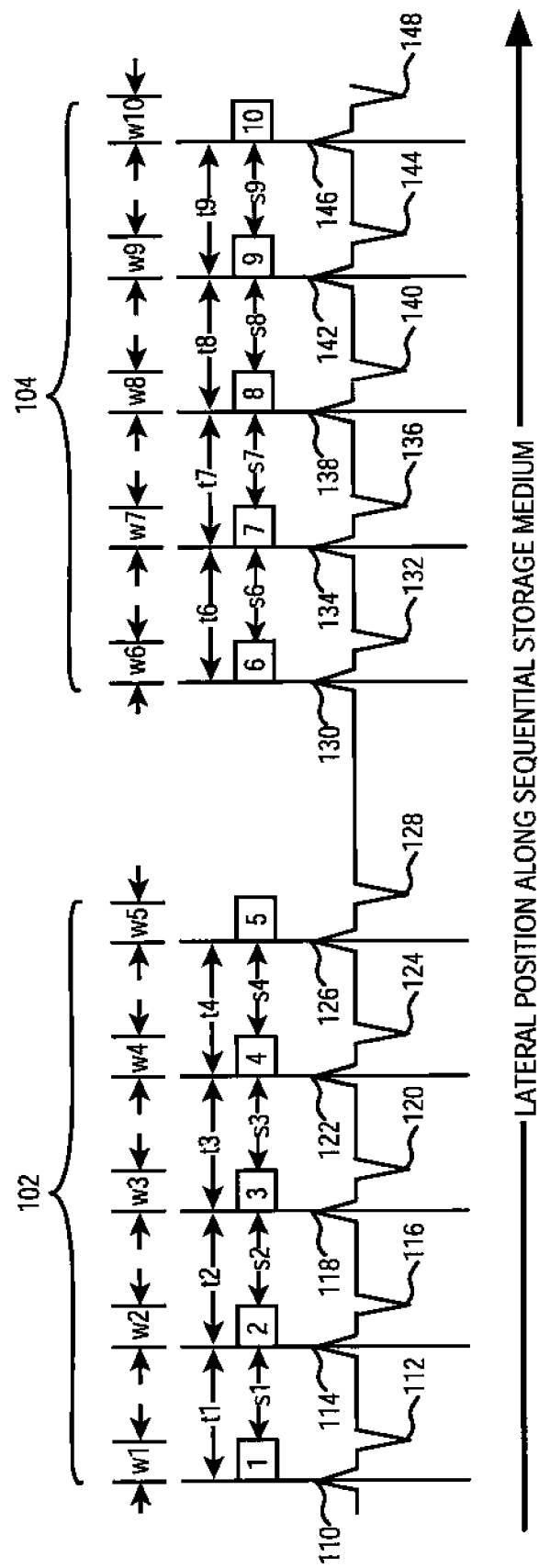
FIG. 1B illustrates widths and spacings for the pulses in Subframe 1 for the servo pattern of FIG. 1A.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In sequential data storage media, such as for example magnetic tape storage media, servo patterns are encoded in non-data portions of the medium. Those servo patterns are used to position a read/write head with respect to a plurality of data tracks, to provide sync data, to provide manufacturer data, and to determine linear position ("LPOS") along the length of the medium.

Referring to FIG. 1A, recorded servo pattern 100 consists of transitions with two different azimuthal slopes. Read/write head position is derived from the relative timing of pulses generated by a narrow head reading the pattern. Servo pattern 100 also allows the encoding of LPOS information without affecting the generation of the transversal position error signal ("PES"). Servo pattern 100 comprises Subframe 1 which comprises burst pattern 102 in combination with burst pattern 104, and Subframe 2 which comprises burst pattern 106 in combination with burst pattern 108.

FIG. 1B further illustrates the format of servo bursts 102 and 104, wherein bursts 102 and 104 do not encode information. Referring now to FIGS. 1A and 1B, servo burst 102 comprises servo stripes 1 thru 5 and corresponding pulses 1 thru 5. Servo burst 104 comprises servo stripes 6 thru 10 and corresponding pulses 6 thru 10.

Pulse 1 of burst 102 comprises a first magnetic phase shift 110, a second magnetic phase shift 112, and a width w1 between phase shifts 110 and 112. Pulse 2 of burst 102 comprises a third magnetic phase shift 114, a fourth magnetic phase shift 116, and a width w2 between phase shifts 114 and 116. A separation t1 separates first magnetic phase shift 110 and third magnetic phase shift 114. A separation s1 separates second magnetic phase shift 112 and third magnetic phase shift 114.

Pulse 3 of burst 102 comprises a fifth magnetic phase shift 118, a sixth magnetic phase shift 120, and a width w3 between phase shifts 118 and 120. A separation t2 separates third magnetic phase shift 114 and fifth magnetic phase shift 118. A separation s2 separates fourth magnetic phase shift 116 and fifth magnetic phase shift 118.

Pulse 4 of burst 102 comprises a seventh magnetic phase shift 122, an eighth magnetic phase shift 124, and a width w4 between phase shifts 122 and 124. A separation t3 separates fifth magnetic phase shift 118 and seventh magnetic phase shift 122. A separation s3 separates sixth magnetic phase shift 120 and seventh magnetic phase shift 122.

Pulse 5 of burst 102 comprises a ninth magnetic phase shift 126, a tenth magnetic phase shift 128, and a width w5 between phase shifts 126 and 128. A separation t4 separates seventh magnetic phase shift 122 and ninth magnetic phase shift 126. A separation s4 separates eighth magnetic phase shift 124 and ninth magnetic phase shift 126.

Pulse 6 of burst 104 comprises an eleventh magnetic phase shift 130, a twelfth magnetic phase shift 132, and a width w6 between phase shifts 130 and 132. Pulse 7 of burst 104 comprises a thirteenth magnetic phase shift 134, a fourteenth magnetic phase shift 136, and a width w7 between phase shifts 134 and 136. A separation t6 separates eleventh magnetic phase shift 130 and thirteenth magnetic phase shift 134. A separation s6 separates twelfth magnetic phase shift 132 and thirteenth magnetic phase shift 134.

Pulse 8 of burst 104 comprises a fifteenth magnetic phase shift 138, a sixteenth magnetic phase shift 140, and a width w8 between phase shifts 138 and 140. A separation t7 separates thirteenth magnetic phase shift 134 and fifteenth magnetic phase shift 138. A separation s7 separates fourteenth magnetic phase shift 136 and fifteenth magnetic phase shift 138. Pulse 9 of burst 104 comprises a seventeenth magnetic phase shift 142, an eighteenth magnetic phase shift 144, and a width w9 between phase shifts 142 and 144. A separation t8 separates fifteenth magnetic phase shift 138 and seventeenth magnetic phase shift 142. A separation s3 separates sixteenth magnetic phase shift 140 and seventeenth magnetic phase shift 142.

Pulse 10 of burst 104 comprises a nineteenth magnetic phase shift 146, a twentieth magnetic phase shift 148, and a width w10 between phase shifts 146 and 148. A separation t9 separates seventeenth magnetic phase shift 142 and nineteenth magnetic phase shift 146. A separation s9 separates eighteenth magnetic phase shift 144 and nineteenth magnetic phase shift 146.

In the non-encoded embodiment of bursts 102 and 104 illustrated in FIGS. 1A and 1B, w1=w2=w3=w4=w5=w6=w7=w8=w9=w10, t1=t2=t3=t4=t6=t7=t8=t9, and s1=s2=s3=s4=s6=s7=s8=s9. In certain embodiments, w1 through w10, inclusive, equal 2.0 microns, t1-t4 and t6-t9 equal 5.0 microns, and s1-s4 and s6-s9 equal 3.0 microns.

Figure 1C:
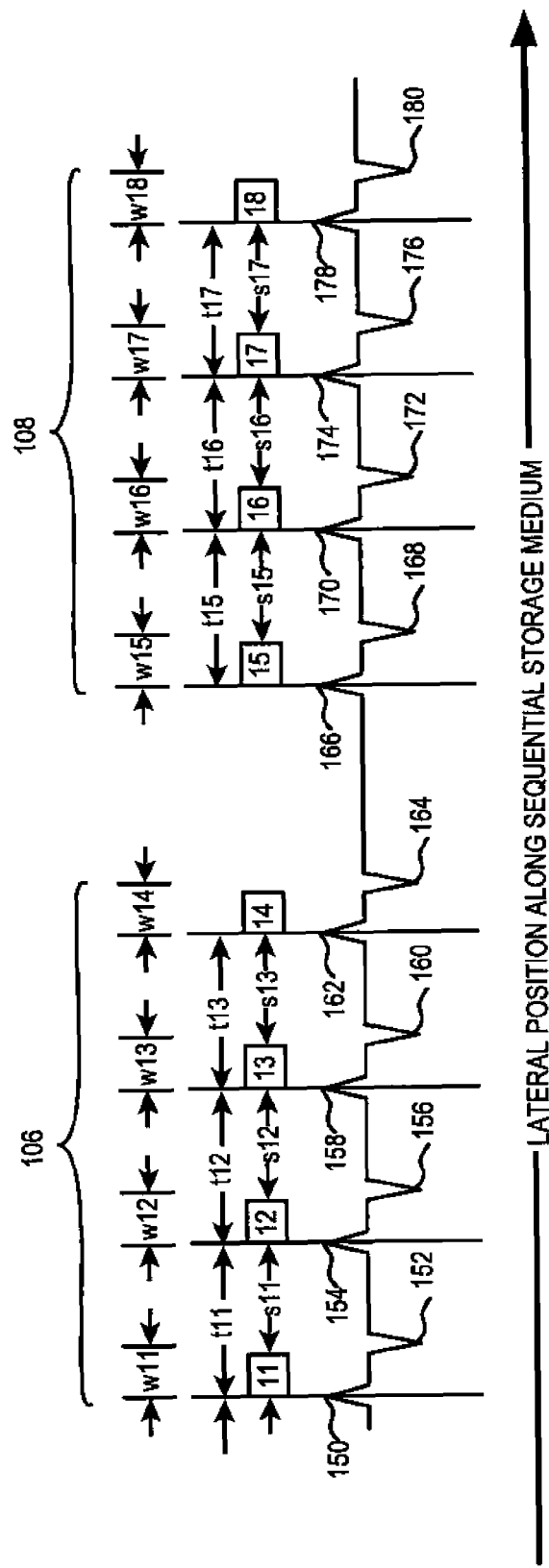
FIG. 1C illustrates widths and spacings for the pulses in Subframe 2 for the servo pattern of FIG. 1A.

FIG. 1C further illustrates the format of servo bursts 106 and 108, wherein bursts 106 and 108 do not encode information. Referring now to FIGS. 1A and 1C, servo burst 106 comprises servo stripes 11 thru 14 and corresponding pulses 11 thru 14. Servo burst 108 comprises servo stripes 15 thru 18 and corresponding pulses 15 thru 18.

Pulse 11 of burst 106 comprises a first magnetic phase shift 150, a second magnetic phase shift 152, and a width w1 between phase shifts 150 and 152. Pulse 12 of burst 106 comprises a third magnetic phase shift 154, a fourth magnetic phase shift 156, and a width w12 between phase shifts 154 and 156. A separation t11 separates first magnetic phase shift 150 and third magnetic phase shift 154. A separation s11 separates second magnetic phase shift 152 and third magnetic phase shift 154.

Pulse 13 of burst 106 comprises a fifth magnetic phase shift 158, a sixth magnetic phase shift 160, and a width w13 between phase shifts 158 and 160. A separation t12 separates third magnetic phase shift 154 and fifth magnetic phase shift 158. A separation s12 separates fourth magnetic phase shift 156 and fifth magnetic phase shift 158.

Pulse 14 of burst 106 comprises a seventh magnetic phase shift 162, an eighth magnetic phase shift 164, and a width w14 between phase shifts 162 and 164. A separation t13 separates fifth magnetic phase shift 158 and seventh magnetic phase shift 162. A separation s13 separates sixth magnetic phase shift 160 and seventh magnetic phase shift 162.

Pulse 15 of burst 108 comprises a ninth magnetic phase shift 166, a tenth magnetic phase shift 168, and a width w15 between phase shifts 166 and 168. Pulse 16 of burst 108 comprises an eleventh magnetic phase shift 170, a twelfth magnetic phase shift 172, and a width w16 between phase shifts 170 and 172. A separation t15 separates ninth magnetic phase shift 166 and eleventh magnetic phase shift 170. A separation s15 separates tenth magnetic phase shift 168 and eleventh magnetic phase shift 170.

Pulse 17 of burst 108 comprises a thirteenth magnetic phase shift 174, a fourteenth magnetic phase shift 176, and a width w17 between phase shifts 174 and 176. A separation t16 separates eleventh magnetic phase shift 170 and thirteenth magnetic phase shift 174. A separation s16 separates twelfth magnetic phase shift 172 and thirteenth magnetic phase shift 174.

Pulse 18 of burst 108 comprises a fifteenth magnetic phase shift 178, a sixteenth magnetic phase shift 180, and a width w18 between phase shifts 178 and 180. A separation t17 separates thirteenth magnetic phase shift 174 and fifteenth magnetic phase shift 178. A separation s17 separates fourteenth magnetic phase shift 176 and fifteenth magnetic phase shift 178.

In the non-encoded embodiment of bursts 106 and 108 illustrated in FIGS. 1A and 1C, w11=w12=w13=w14=w15=w16=w17=w18, t11=t12=t13=t15=t16=t17, and s11=s12=s13=s15=s16=s17. In certain embodiments, w11 through 18, inclusive, equal 2.0 microns, t11-t13 and t15-t17 equal 5.0 microns, and s11-s13 and s15-s17 equal 3.0 microns.

FIG. 2A shows prior art servo pattern 200. The spacings between the pulses in Subframe 1, i.e. bursts 202 and 204, have been altered with respect to the nominal spacings shown in FIGS. 1A and 1B. The widths w1 through w10 of the pulses in bursts 202 and 204 are equal. Using prior art methods, servo pattern 200 encodes a bit of information, wherein that bit is decoded to comprise a value of "1".

Figure 2B:
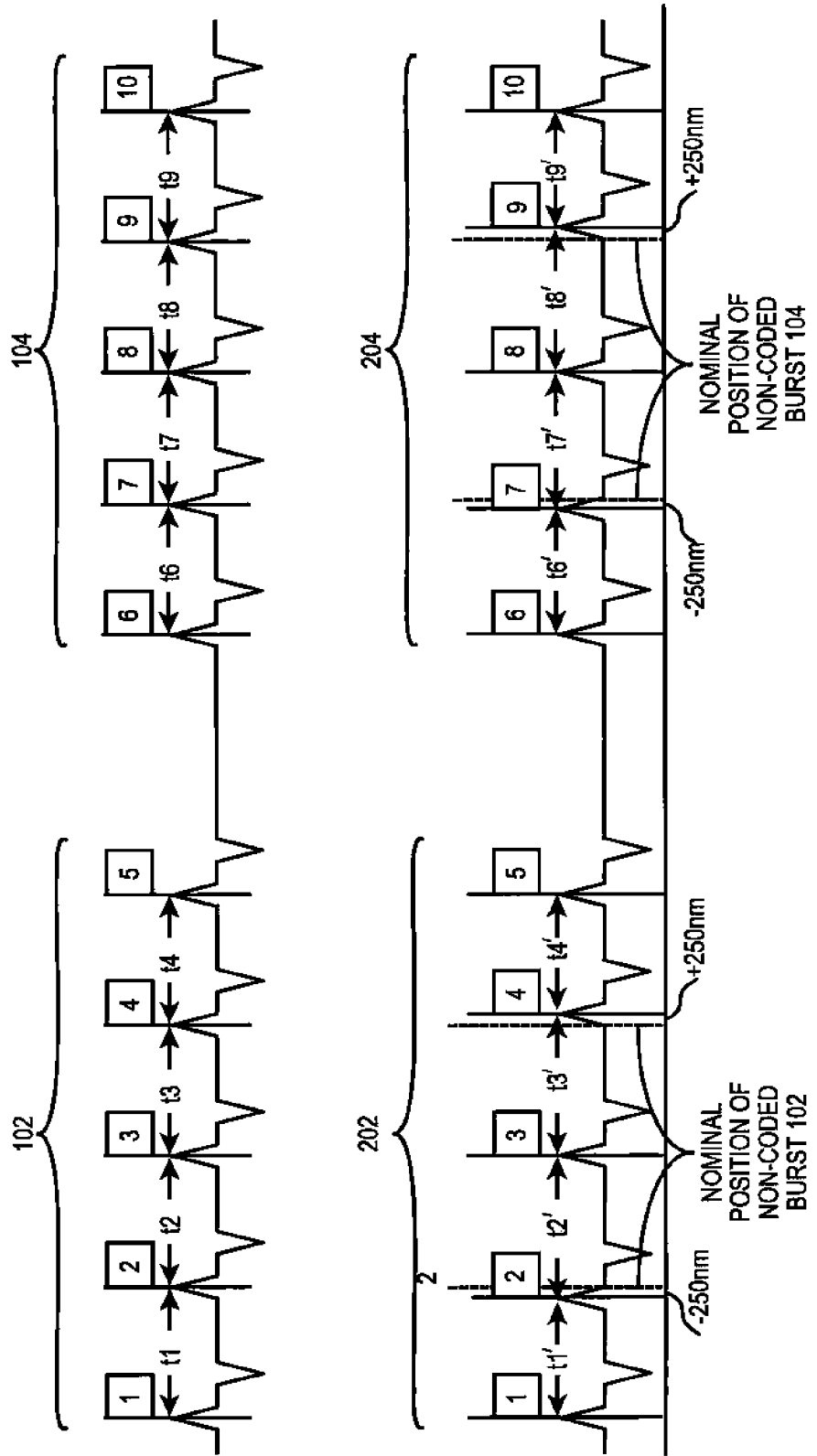
FIG. 2B illustrates widths and spacings for the pulses in Subframe 1 for the servo pattern of FIG. 2A.

Referring now to FIGS. 2A and 2B, pulse 2 in burst 202, and pulse 7 in burst 204, are shifted a distance of −250 nanometers from the −nominal placements of pulses 2 and 7 in bursts 102 and 104, respectively. In addition, pulse 4 in burst 202, and pulse 9 in burst 204, are shifted a distance of +250 nanometers from the nominal placements pulses 4 and 9 in bursts 102 and 104, respectively. As a result, t1' and t4' in burst 202 are decreased to 4.75 nanometers, and t2' and t3' in burst 202 are increased to 5.25 nanometers. Similarly, t6' and t9' in burst 204 are decreased to 4.75 nanometers, and t7' and t8' in burst 204 are increased to 5.25 nanometers.

Figure 3A:
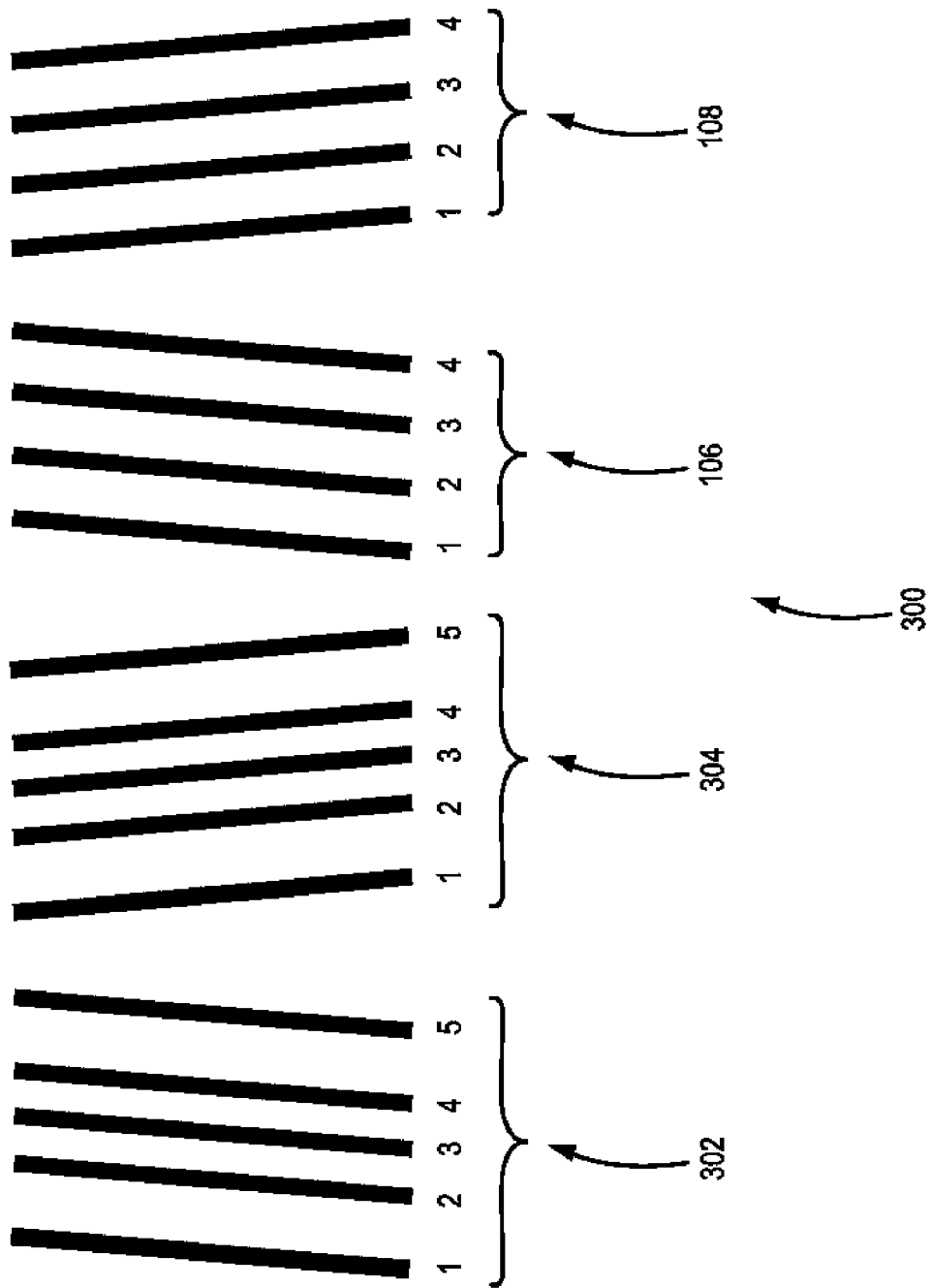
FIG. 3A illustrates a second prior art servo pattern used to encode a single bit of information.

FIG. 3A shows prior art servo pattern 300. The spacings between the pulses in Subframe 1, i.e. bursts 302 and 304, have been altered with respect to the nominal spacings shown in FIGS. 1A and 1B. The widths w1 through w10 of the pulses in bursts 302 and 304 are equal. Using prior art methods, servo pattern 300 encodes a bit of information, wherein that bit is decoded to comprise a value of "0".

Figure 3B:
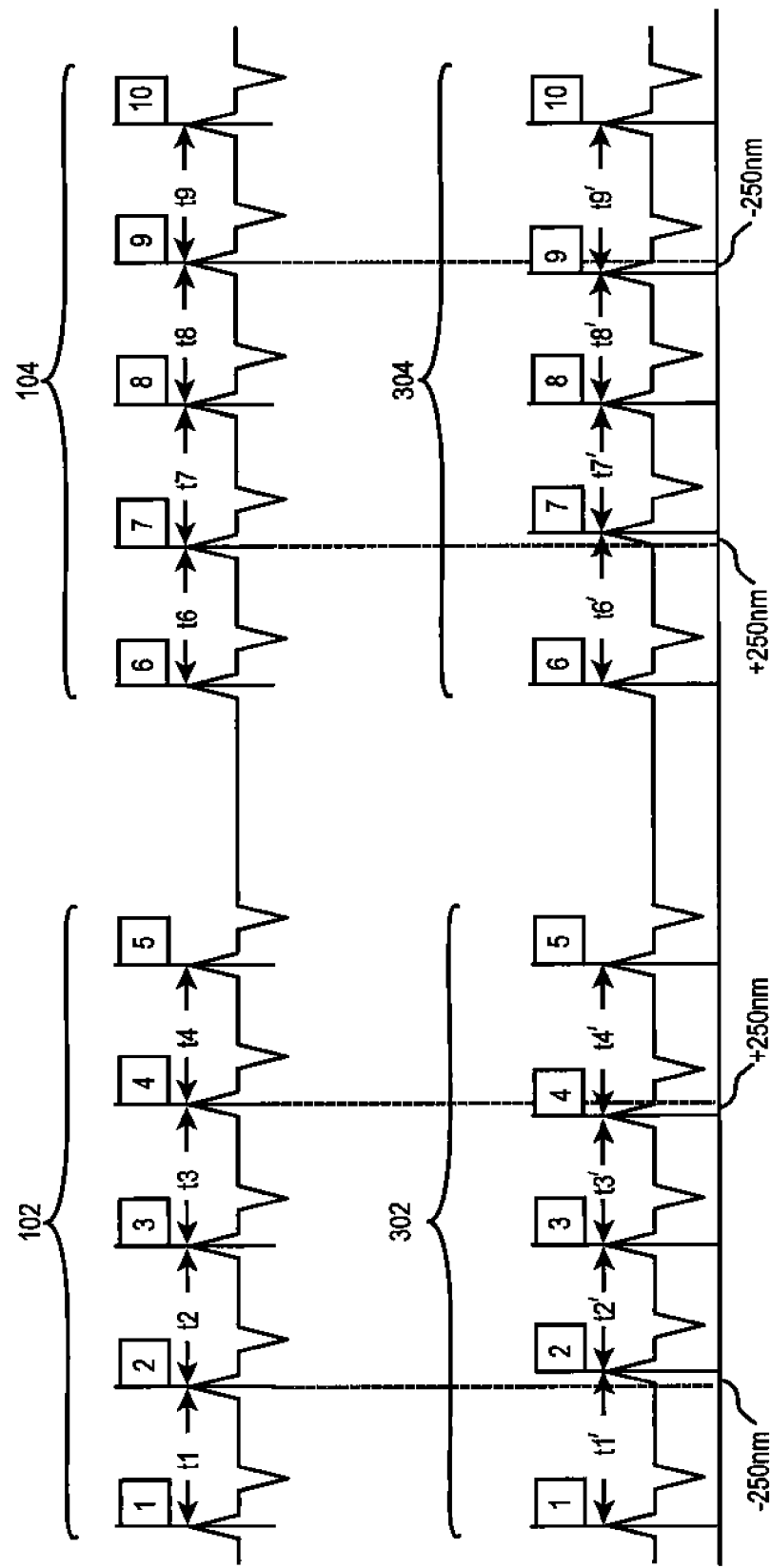
FIG. 3B illustrates widths and spacings for the pulses in Subframe 1 for the servo pattern of FIG. 3A.

Referring now to FIGS. 3A and 3B, pulse 2 in burst 302, and pulse 7 in burst 304, are shifted a distance of +250 nanometers from the nominal placements of pulses 2 and 7 in bursts 102 and 104, respectively. In addition, pulse 4 in burst 302, and pulse 9 in burst 304, are shifted a distance of −250 nanometers from the nominal placements of pulses 4 and 9 in bursts 102 and 104, respectively. As a result t1' and t4' in burst 302 are increased to 5.25 nanometers, and t2' and t3' in burst 302 are decreased to 4.75 nanometers. Similarly, t6' and t9' in burst 304 are increased to 5.25 nanometers, and t7' and t5' in burst 304 are decreased to 4.75 nanometers.

In certain embodiments, Applicant's servo pattern architecture utilizes a Subframe 1 that encodes 2 bits of information in combination with prior art Subframe 2 that does not encode any information. FIGS. 4, 5, 6, and 7, illustrate Applicant's Subframe 1 architectures.

Figure 8:
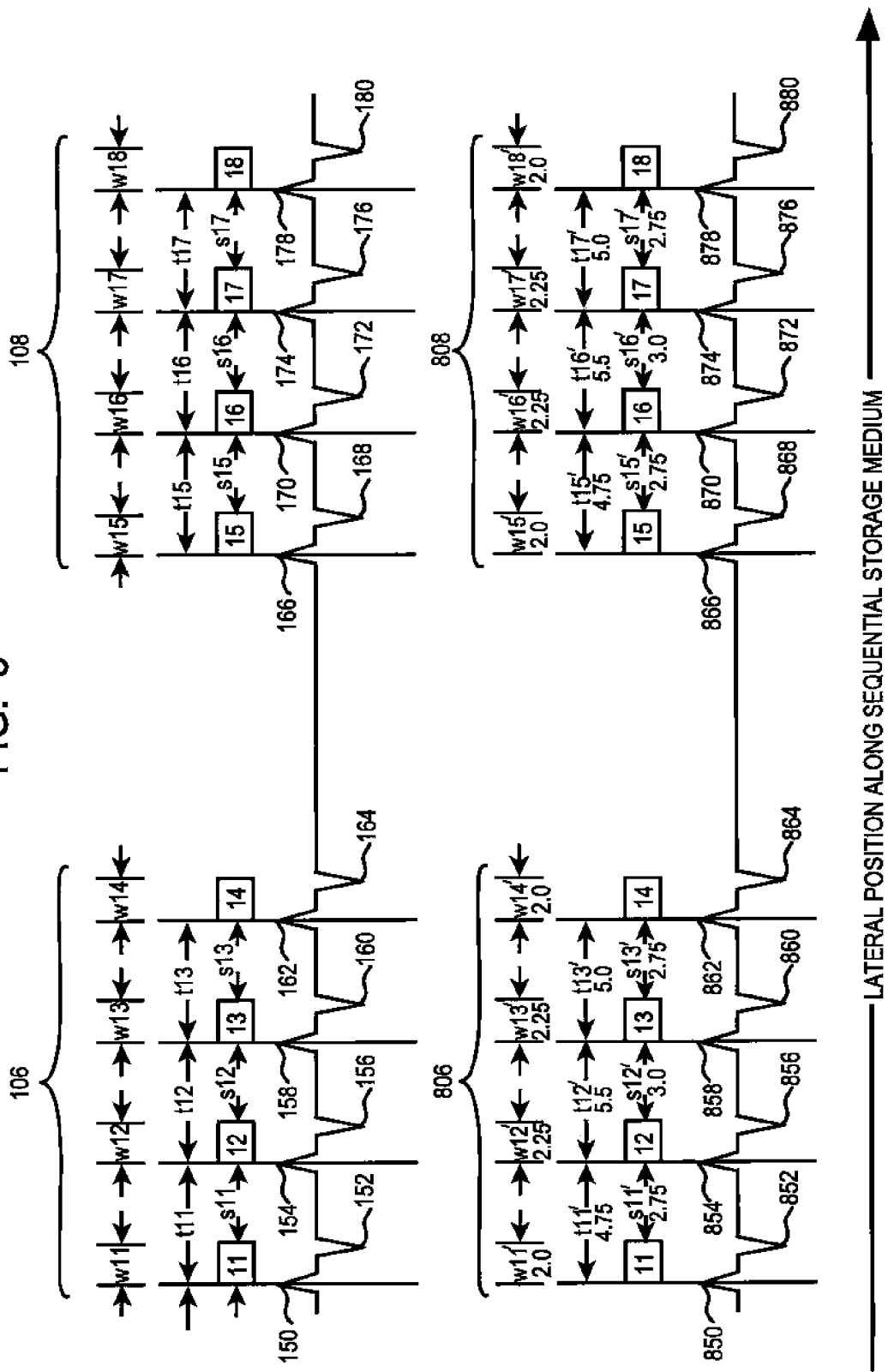
FIG. 8 illustrates Applicant's Subframe 2 architecture used to encode one bit of information having a value of "1"
Figure 9:
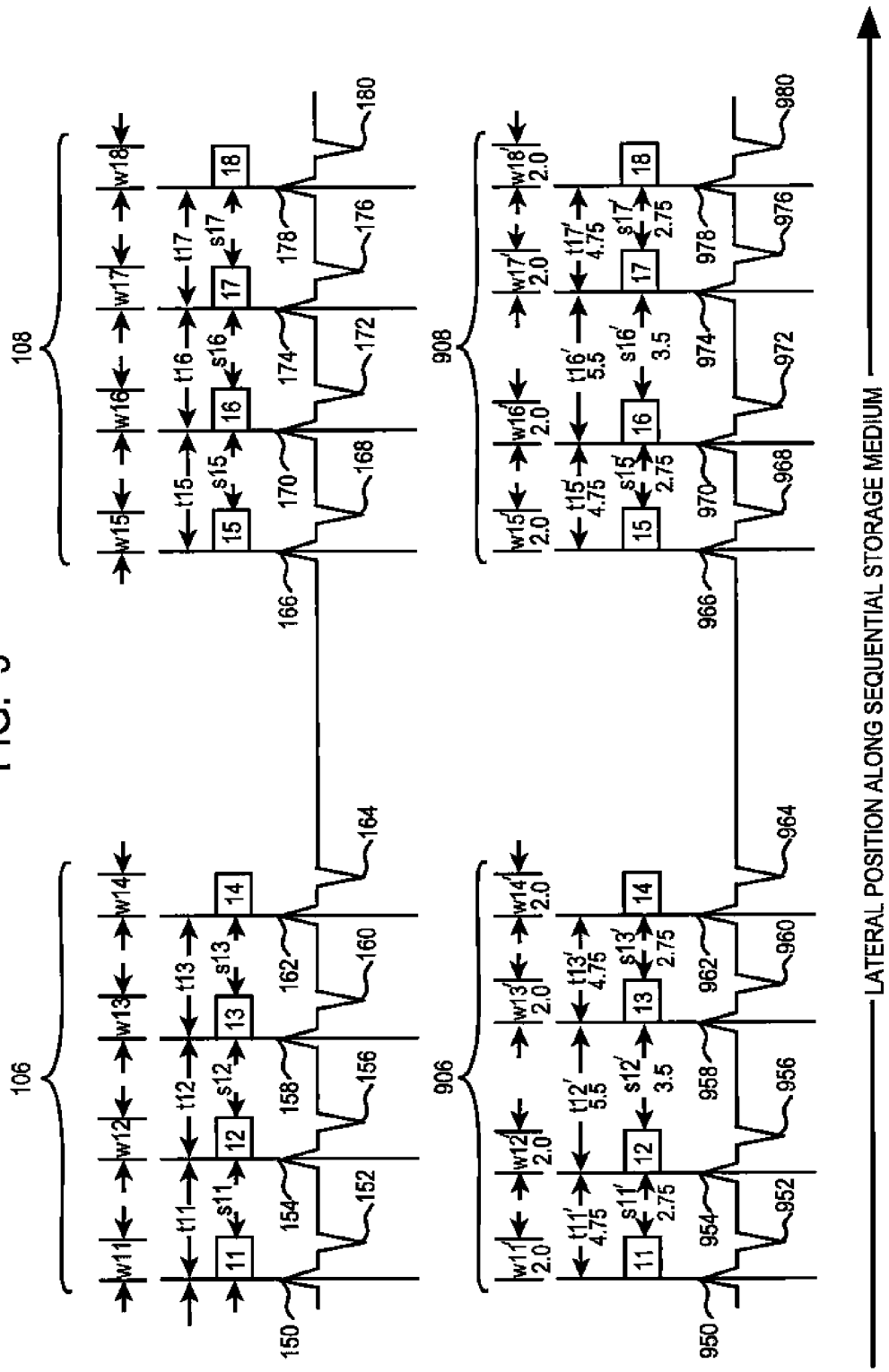
FIG. 9 illustrates Applicant's Subframe 2 architecture used to encode one bit of information having a value of "0".

In certain embodiments, Applicant's servo pattern architecture utilizes a Subframe 1 that encodes 2 bits of information in combination with Applicant's Subframe 2 architecture that encodes one bit of information. FIGS. 8 and 9 illustrate Applicant's Subframe 2 architectures.

Figure 4A:
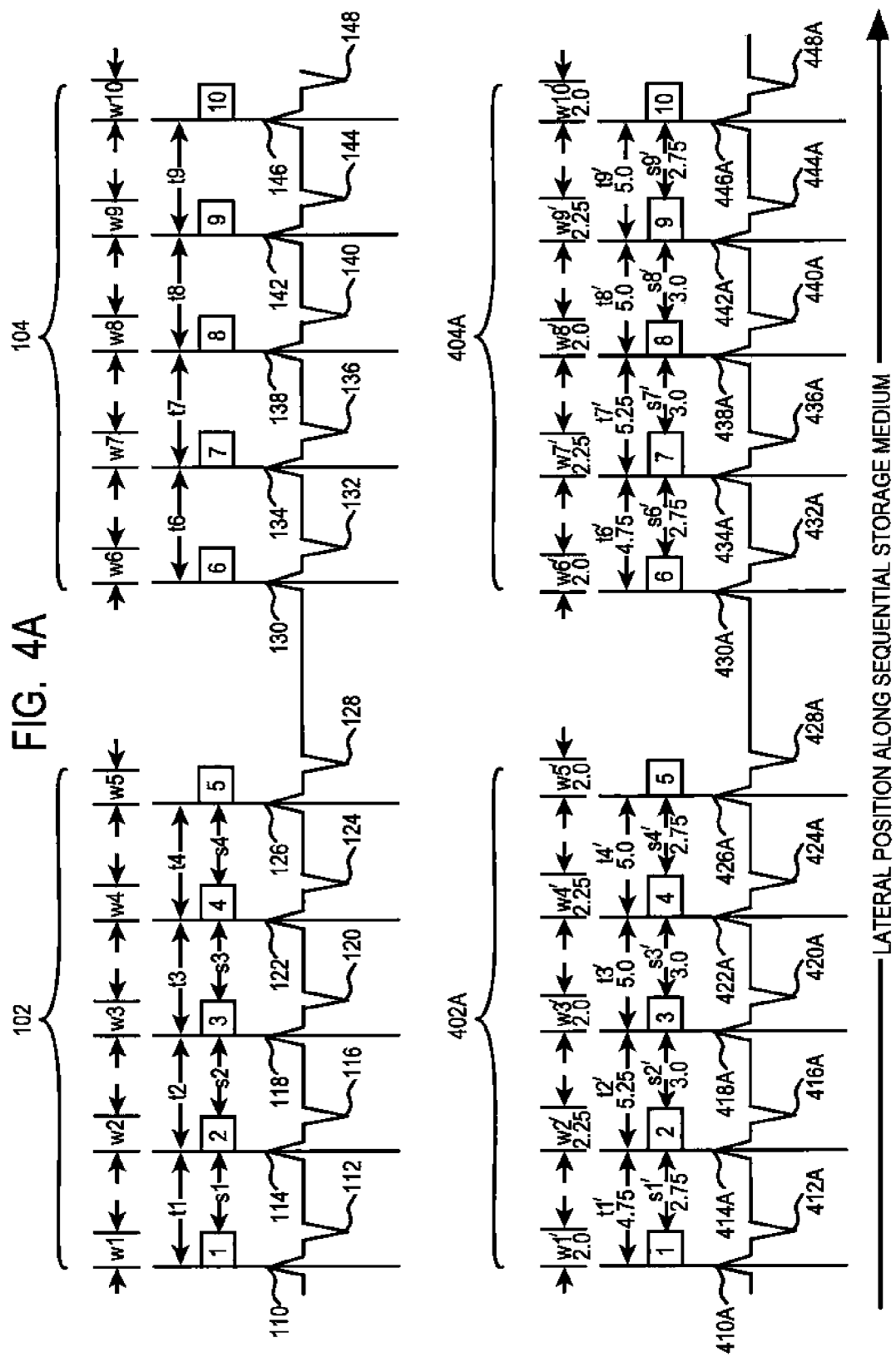
FIG. 4A illustrates a first embodiment of Applicant's Subframe 1 architecture used to encode two bits of information having a value of "10"

FIG. 4A illustrates non-encoded bursts 102 and 104, and Applicant's servo bursts 402A and 404A. Applicant's servo bursts 402 and 404 encode information having a value of "10".

Referring now to FIG. 4A, pulse 1 of burst 402A comprises a first magnetic phase shift 410A, a second magnetic phase shift 412A, and a width w1' between phase shifts 410A and 412A. Pulse 2 of burst 402A comprises a third magnetic phase shift 414A, a fourth magnetic phase shift 416A, and a width w2' between phase shifts 414A and 416A. A separation t1' separates first magnetic phase shift 410A and third magnetic phase shift 414A. A separation s1' separates second magnetic phase shift 412A and third magnetic phase shift 414A.

Pulse 3 of burst 402A comprises a fifth magnetic phase shift 418A, a sixth magnetic phase shift 420A, and a width w3' between phase shifts 418A and 420A. A separation t2' separates third magnetic phase shift 414A and fifth magnetic phase shift 418A. A separation s2' separates fourth magnetic phase shift 416A and fifth magnetic phase shift 418A.

Pulse 4 of burst 402A comprises a seventh magnetic phase shift 422A an eighth magnetic phase shift 424A, and a width w4' between phase shifts 422A and 424A. A separation t3' separates fifth magnetic phase shift 418A and seventh magnetic phase shift 422A. A separation s3' separates sixth magnetic phase shift 420A and seventh magnetic phase shift 422A. Pulse 5 of burst 402A comprises a ninth magnetic phase shift 426A, a tenth magnetic phase shift 428A, and a width w5' between phase shifts 426A and 428A. A separation t4' separates seventh magnetic phase shift 422A and ninth magnetic phase shift 426A. A separation s4' separates eighth magnetic phase shift 424A and ninth magnetic phase shift 426A.

Pulse 6 of burst 404A comprises an eleventh magnetic phase shift 430A, a twelfth magnetic phase shift 432A, and a width w6' between phase shifts 430A and 432A. Pulse 7 of burst 404A comprises a thirteenth magnetic phase shift 434A, a fourteenth magnetic phase shift 436A, and a width w7' between phase shifts 434A and 436A. A separation t6' separates eleventh magnetic phase shift 430A and thirteenth magnetic phase shift 434A. A separation s6' separates twelfth magnetic phase shift 432A and thirteenth magnetic phase shift 434A.

Pulse 8 of burst 404A comprises a fifteenth magnetic phase shift 438A, a sixteenth magnetic phase shift 440A, and a width w8' between phase shifts 438A and 440A. A separation t7' separates thirteenth magnetic phase shift 434A and fifteenth magnetic phase shift 438A. A separation s7' separates fourteenth magnetic phase shift 436A and fifteenth magnetic phase shift 438A. Pulse 9 of burst 404A comprises a seventeenth magnetic phase shift 442A, an eighteenth magnetic phase shift 444A, and a width w9' between phase shifts 442A and 444A. A separation t8' separates fifteenth magnetic phase shift 438A and seventeenth magnetic phase shift 442A. A separation s8' separates sixteenth magnetic phase shift 440A and seventeenth magnetic phase shift 442A.

Pulse 10 of burst 404A comprises a nineteenth magnetic phase shift 446A, a twentieth magnetic phase shift 448A, and a width w10' between phase shifts 446A and 448A. A separation t9' separates seventeenth magnetic phase shift 442A and nineteenth magnetic phase shift 446A. A separation s9' separates eighteenth magnetic phase shift 444A and nineteenth magnetic phase shift 446A.

In the illustrated embodiment of FIG. 4A, in bursts 402A and 404A w1'=w3'=w5'=w6'=w8'=w10'. In certain embodiments, in burst 402A and 404A w1'=w3'=w5'=w6'=w8'=w10'=2.0 microns. In the illustrated embodiment of FIG. 4A, in bursts 402A and 404A w2'=w4'=w7'=w9'. In certain embodiments, in bursts 402A and 404A w2'=w4'=w7'=w9'=2.25 microns.

In certain embodiments, in burst 402A and 404A, t1'=t6'. In certain embodiments, in burst 402A and 404A, t1'=t6' 4.75 microns. In certain embodiments, in bursts 402A and 404A t2'=t7'. In certain embodiments, in bursts 402A and 404A, t2'=t7'=5.25 microns. In certain embodiments, in burst 402A and 404A, t3'=t4'=t8'=t9'. In certain embodiments, in burst 402A and 404A, t3'=t4'=t8'=t9'=5.0 microns.

In certain embodiments, in bursts 402A and 404A, s1'=s4'=s6'=s9'. In certain embodiments, in bursts 402A and 404A, s1'=s4'=s6'=s9'=2.75 microns. In certain embodiments, in bursts 402A and 404A, s2'=s3'=s7'=s8'. In certain embodiments, in bursts 402A and 404A, s2'=s3'=s7'=s8'=3.0 microns.

Figure 4B:
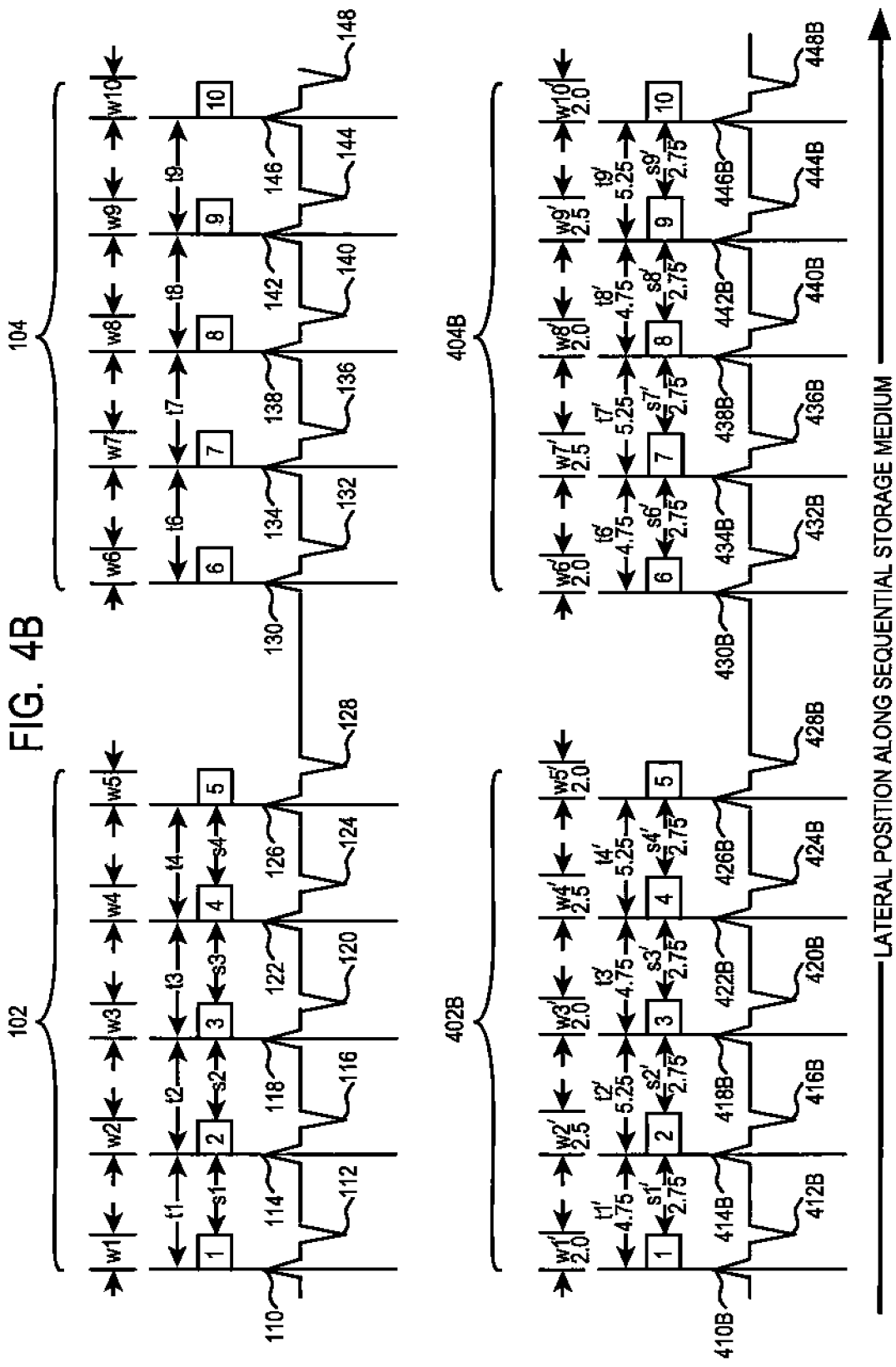
FIG. 4B illustrates a second embodiment of Applicant's Subframe 1 architecture used to encode two bits of information having a value of "10"

FIG. 4B illustrates non-encoded bursts 102 and 104, and Applicant's servo bursts 402B and 404B. Applicant's servo bursts 402B and 404B encode information having a value of "10".

Referring now to FIG. 4B, pulse 1 of burst 402B comprises a first magnetic phase shift 410B, a second magnetic phase shift 412B, and a width w1' between phase shifts 410B and 412B. Pulse 2 of burst 402B comprises a third magnetic phase shift 414B, a fourth magnetic phase shift 416B, and a width w2' between phase shifts 414B and 416B. A separation t1' separates first magnetic phase shift 410B and third magnetic phase shift 414B. A separation s1' separates second magnetic phase shift 412B and third magnetic phase shift 414B.

Pulse 3 of burst 402B comprises a fifth magnetic phase shift 418B, a sixth magnetic phase shift 420B, and a width w3' between phase shifts 418B and 420B. A separation t2' separates third magnetic phase shift 414B and fifth magnetic phase shift 418B. A separation s2' separates fourth magnetic phase shift 416B and fifth magnetic phase shift 418B.

Pulse 4 of burst 402B comprises a seventh magnetic phase shift 422B, an eighth magnetic phase shift 424B, and a width w4' between phase shifts 422B and 424B. A separation t3' separates fifth magnetic phase shift 418B and seventh magnetic phase shift 422B. A separation s3' separates sixth magnetic phase shift 420B and seventh magnetic phase shift 422B. Pulse 5 of burst 402B comprises a ninth magnetic phase shift 426B, a tenth magnetic phase shift 428B, and a width w5' between phase shifts 426B and 428B. A separation t4' separates seventh magnetic phase shift 422B and ninth magnetic phase shift 426B. A separation s4' separates eighth magnetic phase shift 424B and ninth magnetic phase shift 426B.

Pulse 6 of burst 404B comprises an eleventh magnetic phase shift 430B, a twelfth magnetic phase shift 432B, and a width w6' between phase shifts 430B and 432B. Pulse 7 of burst 404B comprises a thirteenth magnetic phase shift 434B, a fourteenth magnetic phase shift 436B, and a width w7' between phase shifts 434B and 436B. A separation t6' separates eleventh magnetic phase shift 430B and thirteenth magnetic phase shift 434B. A separation s6' separates twelfth magnetic phase shift 432B and thirteenth magnetic phase shift 434B.

Pulse 8 of burst 404B comprises a fifteenth magnetic phase shift 438B, a sixteenth magnetic phase shift 440B, and a width w8' between phase shifts 438B and 440B. A separation t7' separates thirteenth magnetic phase shift 434B and fifteenth magnetic phase shift 438B. A separation s7' separates fourteenth magnetic phase shift 436B and fifteenth magnetic phase shift 438B. Pulse 9 of burst 404B comprises a seventeenth magnetic phase shift 442B, an eighteenth magnetic phase shift 444B, and a width w9' between phase shifts 442B and 444B. A separation t8' separates fifteenth magnetic phase shift 438B and seventeenth magnetic phase shift 442B. A separation s8' separates sixteenth magnetic phase shift 440B and seventeenth magnetic phase shift 442B.

Pulse 10 of burst 404B comprises a nineteenth magnetic phase shift 446B, a twentieth magnetic phase shift 448B, and a width w10' between phase shifts 446B and 448B. A separation t9' separates seventeenth magnetic phase shift 442B and nineteenth magnetic phase shift 446B. A separation s9' separates eighteenth magnetic phase shift 444B and nineteenth magnetic phase shift 446B.

In the illustrated embodiment of FIG. 4B, in bursts 402B and 404B w1'=w3'=w5' w6'=w8'=w10'. In certain embodiments, in burst 402B and 404B, w1'=w3'=w5'=w6'=w8'=w10'=2.0 microns. In The illustrated embodiment of FIG. 4B, in bursts 402B and 404B, w2'=w4'=w7'=w9'. In certain embodiments, in bursts 402B and 404B, w2'=w4'=w7'=w9'=2.5 microns.

In certain embodiments, in burst 402B and 404B, t1'=t3'=t6'=t8'. In certain embodiments, in burst 402B and 404B, t1'=t3'=t6'=t8'=4.75 microns. In certain embodiments, in bursts 402B and 404B, t2'=t4'=t7'=t9'. In certain embodiments, in bursts 402B and 404B, t1'=t4'=t7'=t9'=5.25 microns.

In certain embodiments, in bursts 402B and 404B, s1'=s2'=s3'=s4'=s6'=s7'=s8'=s9'. In certain embodiments, in bursts 402B and 404B, s1'=s2'=s3'=s4'=s6'=s7'=s8'=s9'=2.75 microns.

Figure 5A:
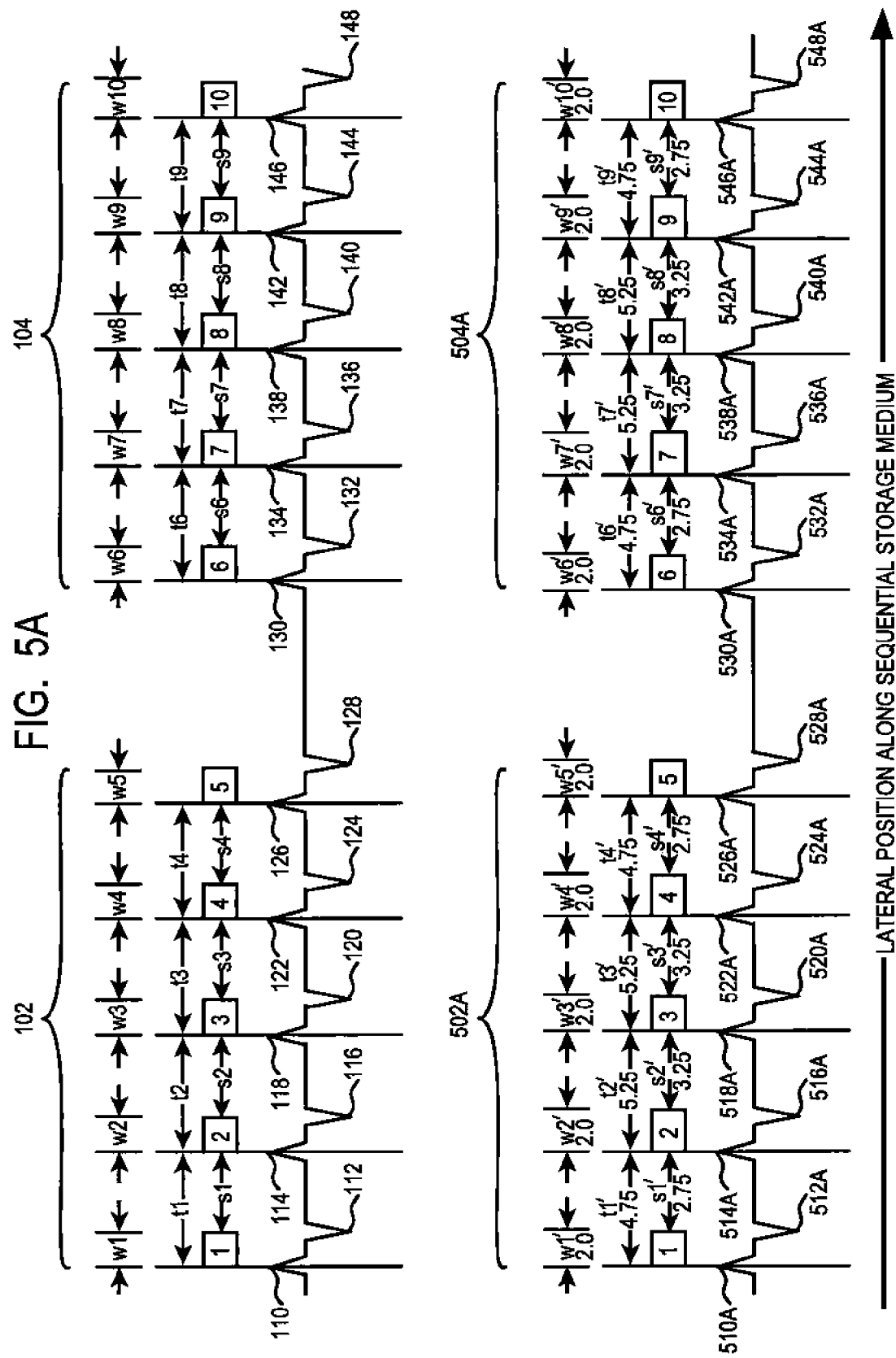
FIG. 5A illustrates a first embodiment of Applicant's Subframe 1 architecture used to encode two bits of information having a value of "11"

FIG. 5A illustrates non-encoded bursts 102 and 104, and Applicant's servo bursts 502A and 504A. In certain embodiments of Applicant's Subframe 1 architecture, Applicant's servo bursts 502A and 504A encode information having a value of "11". Referring now to FIG. 5A, pulse 1 of burst 502A comprises a first magnetic phase shift 510A, a second magnetic phase shift 512A, and a width w1' between phase shifts 510A and 512A. Pulse 2 of burst 502A comprises a third magnetic phase shift 514A, a fourth magnetic phase shift 516A, and a width w2' between phase shifts 514A and 516A. A separation t1' separates first magnetic phase shift 510A and third magnetic phase shift 514A. A separation s1' separates second magnetic phase shift 512A and third magnetic phase shift 514A.

Pulse 3 of burst 502A comprises a fifth magnetic phase shift 518A, a sixth magnetic phase shift 520A, and a width w3' between phase shifts 518A and 520A. A separation t2' separates third magnetic phase shift 514A and fifth magnetic phase shift 518A. A separation s2' separates fourth magnetic phase shift 516A and fifth magnetic phase shift 518A.

Pulse 4 of burst 502A comprises a seventh magnetic phase shift 522A, an eighth magnetic phase shift 524A, and a width w4' between phase shifts 522A and 524A. A separation t3' separates fifth magnetic phase shift 518A and seventh magnetic phase shift 522A. A separation s3' separates sixth magnetic phase shift 520A and seventh magnetic phase shift 522A. Pulse 5 of burst 502A comprises a ninth magnetic phase shift 526A, a tenth magnetic phase shift 528A, and a width w5' between phase shifts 526A and 528A. A separation t4' separates seventh magnetic phase shift 522A and ninth magnetic phase shift 526A. A separation s4' separates eighth magnetic phase shift 524A and ninth magnetic phase shift 526A.

Pulse 6 of burst 504A comprises an eleventh magnetic phase shift 530A, a twelfth magnetic phase shift 532A, and a width w6' between phase shifts 530A and 532A. Pulse 7 of burst 504A comprises a thirteenth magnetic phase shift 534A, a fourteenth magnetic phase shift 536A, and a width w7' between phase shifts 534A and 536A. A separation t6' separates eleventh magnetic phase shift 530A and thirteenth magnetic phase shift 534A. A separation s6' separates twelfth magnetic phase shift 532A and thirteenth magnetic phase shift 534A.

Pulse 8 of burst 504A comprises a fifteenth magnetic phase shift 538A, a sixteenth magnetic phase shift 540A, and a width w8' between phase shifts 538A and 540A. A separation t7' separates thirteenth magnetic phase shift 534A and fifteenth magnetic phase shift 538A. A separation s7' separates fourteenth magnetic phase shift 536A and fifteenth magnetic phase shift 538A. Pulse 9 of burst 504A comprises a seventeenth magnetic phase shift 542A, an eighteenth magnetic phase shift 544A, and a width w9' between phase shifts 542A and 544A. A separation t8' separates fifteenth magnetic phase shift 538A and seventeenth magnetic phase shift 542A. A separation s8' separates sixteenth magnetic phase shift 540A and seventeenth magnetic phase shift 542A.

Pulse 10 of burst 504A comprises a nineteenth magnetic phase shift 546A, a twentieth magnetic phase shift 548A, and a width w10' between phase shifts 546A and 548A. A separation t9' separates seventeenth magnetic phase shift 542A and nineteenth magnetic phase shift 546A. A separation s9' separates eighteenth magnetic phase shift 544A and nineteenth magnetic phase shift 546A.

In the illustrated embodiment of FIG. 5A, in bursts 502A and 504A, w1'=w2'=w3'=w4'=w5'=w6'=w7'=w8'=w9'=w10'. In certain embodiments, in burst 502A and 504A, w1'=w2'=w3'=w4'=w5'=w6'=w7'=w8'=w9'=w10'=2.0 microns.

In certain embodiments, in burst 502A and 504A, t1'=t4'=t6'=t9'. In certain embodiments, in burst 502A and 504A, t1'=t4'=t6'=t9'=4.75 microns. In certain embodiments, in bursts 502A and 504A t2'=t3' t7' t8'. In certain embodiments, in bursts 502A and 504A, t1'=t3'=t7'=t8'=5.25 microns.

In certain embodiments, in bursts 502A and 504A, s1'=s4'=s6'=s9'. In certain embodiments, in bursts 502A and 504A, s1'=s4'=s6'=s9'=2.75 microns. In certain embodiments, in bursts 502A and 504A, s2'=s3'=s7'=s8'. In certain embodiments, in bursts 502A and 504A, s2'=s3'=s7'=s8'=3.25 microns.

Figure 5B:
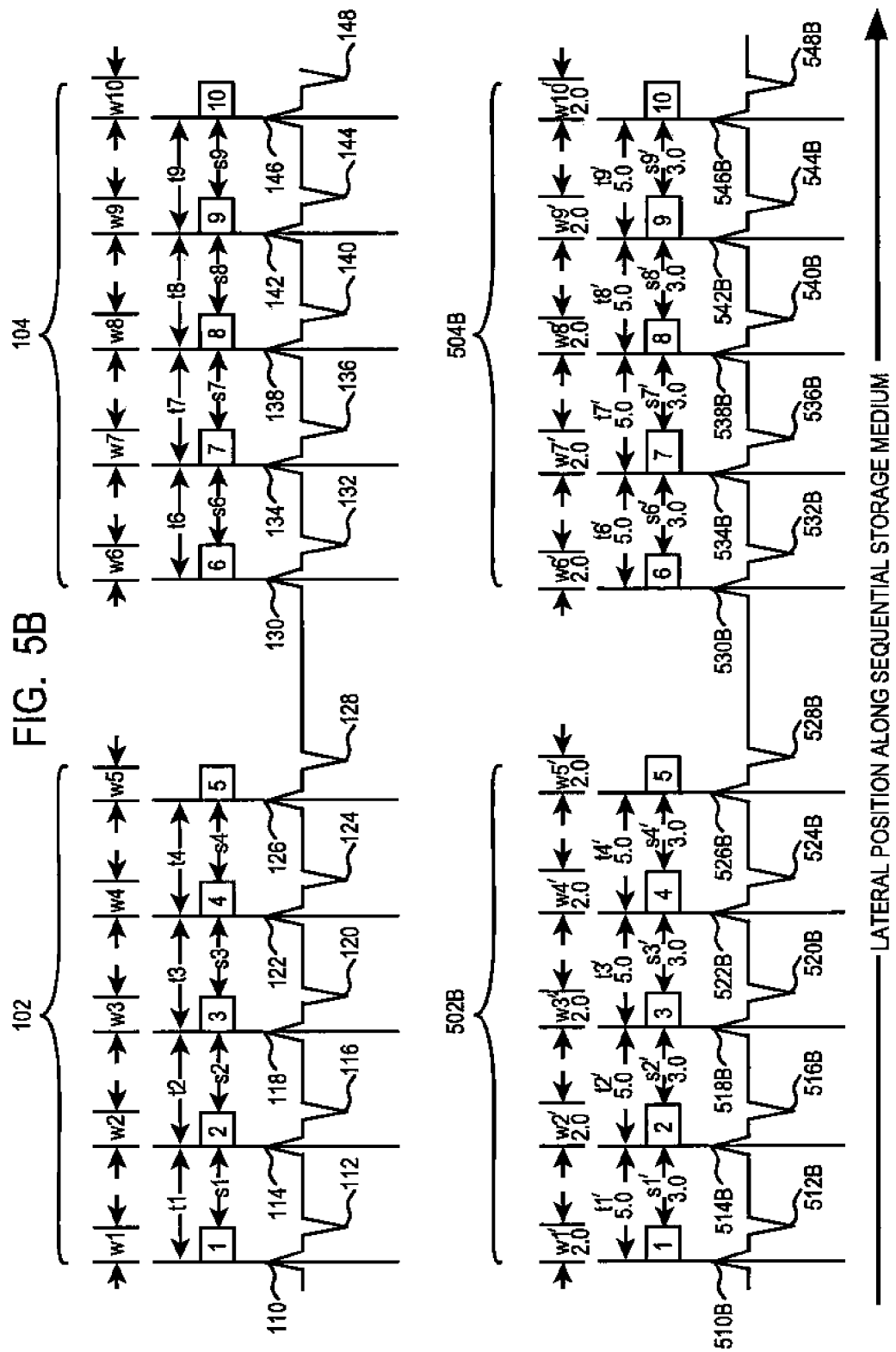
FIG. 5B illustrates a second embodiment of Applicant's Subframe 1 architecture used to encode two bits of information having a value of "11"

FIG. 5B illustrates non-encoded bursts 102 and 104, and Applicant's servo bursts 502B and 504B. In certain embodiments of Applicant's Subframe 1 architecture, Applicant's servo bursts 502B and 504B encode information having a value of "11". Burst 502B comprises the same pulses, pulse widths, and pulse separations as does burst 102. Burst 504B comprises the same pulses, pulse widths, and pulse separations as does burst 104.

Referring now to FIG. 5B, pulse 1 of burst 502B comprises a first magnetic phase shift 510B, a second magnetic phase shift 512B, and a width w1' between phase shifts 510B and 5112B. Pulse 2 of burst 502B comprises a third magnetic phase shift 514B, a fourth magnetic phase shift 516B, and a width w2' between phase shifts 514B and 516B. A separation t1' separates first magnetic phase shift 510B and third magnetic phase shift 514B. A separation s1' separates second magnetic phase shift 512B and third magnetic phase shift 514B.

Pulse 3 of burst 502B comprises a fifth magnetic phase shift 518B, a sixth magnetic phase shift 520B, and a width w3' between phase shifts 518B and 520B. A separation t2' separates third magnetic phase shift 514B and fifth magnetic phase shift 518B. A separation s2' separates fourth magnetic phase shift 516B and fifth magnetic phase shift 518B.

Pulse 4 of burst 502B comprises a seventh magnetic phase shift 522B, an eighth magnetic phase shift 524B, and a width w4' between phase shifts 522B and 524B. A separation t3' separates fifth magnetic phase shift 518B and seventh magnetic phase shift 522B. A separation s3' separates sixth magnetic phase shift 520B and seventh magnetic phase shift 522B. Pulse 5 of burst 502B comprises a ninth magnetic phase shift 526B, a tenth magnetic phase shift 528B, and a width w5' between phase shifts 526B and 528B. A separation t4' separates seventh magnetic phase shift 5228 and ninth magnetic phase shift 526B. A separation s4' separates eighth magnetic phase shift 524B and ninth magnetic phase shift 526B.

Pulse 6 of burst 504B comprises an eleventh magnetic phase shift 530B, a twelfth magnetic phase shift 532B, and a width w6' between phase shifts 530B and 532B. Pulse 7 of burst 504B comprises a thirteenth magnetic phase shift 534B, a fourteenth magnetic phase shift 536B and a width w7' between phase shifts 534B and 536B. A separation t6' separates eleventh magnetic phase shift 530B and thirteenth magnetic phase shift 534B. A separation s6' separates twelfth magnetic phase shift 532B and thirteenth magnetic phase shift 534B.

Pulse 8 of burst 504B comprises a fifteenth magnetic phase shift 538B, a sixteenth magnetic phase shift 540B, and a width w8' between phase shifts 538B and 540B. A separation t7' separates thirteenth magnetic phase shift 534B and fifteenth magnetic phase shift 538B. A separation s7' separates fourteenth magnetic phase shift 536B and fifteenth magnetic phase shift 538B. Pulse 9 of burst 504B comprises a seventeenth magnetic phase shift 542B, an eighteenth magnetic phase shift 544B, and a width w9' between phase shifts 542B and 544B. A separation t8' separates fifteenth magnetic phase shift 538B and seventeenth magnetic phase shift 542B. A separation s8' separates sixteenth magnetic phase shift 540B and seventeenth magnetic phase shift 542B.

Pulse 10 of burst 504B comprises a nineteenth magnetic phase shift 546B, a twentieth magnetic phase shift 548B, and a width w10' between phase shifts 546B and 548B. A separation t9' separates seventeenth magnetic phase shift 542B and nineteenth magnetic phase shift 546B. A separation s9' separates eighteenth magnetic phase shift 544B and nineteenth magnetic phase shift 546B.

In the illustrated embodiment of FIG. 5B, in bursts 502B and 504B, w1'=w2' w3'=w4'=w5'=w6'=w7'=w8'=w9'=w10'. In certain embodiments, in burst 502B and 504B, w1'=w2'=w3'=w4'=w5'=w6'=w7'=w8'=w9'=w10'=2.0 microns. In certain embodiments, in burst 502B and 504B, t1'=t2'=t3'=t4'=t5'=t6'=t7'=t8'=t9'. In certain embodiments, in burst 502B and 504B, t1'=t2'=t3'=t4'=t5'=t 6'=t7'=t8'=t9'=5.0 microns. In certain embodiments, in bursts 502A and 504A, s1'=s2'=s3'=s4'=s5'=s6'=s7'=s8'=s9'. In certain embodiments, in bursts 502A and 504A, s1'=s2'=s3'=s4'=s5'=s6'=s7'=s8'=s9'=3.0 microns.

Figure 6:
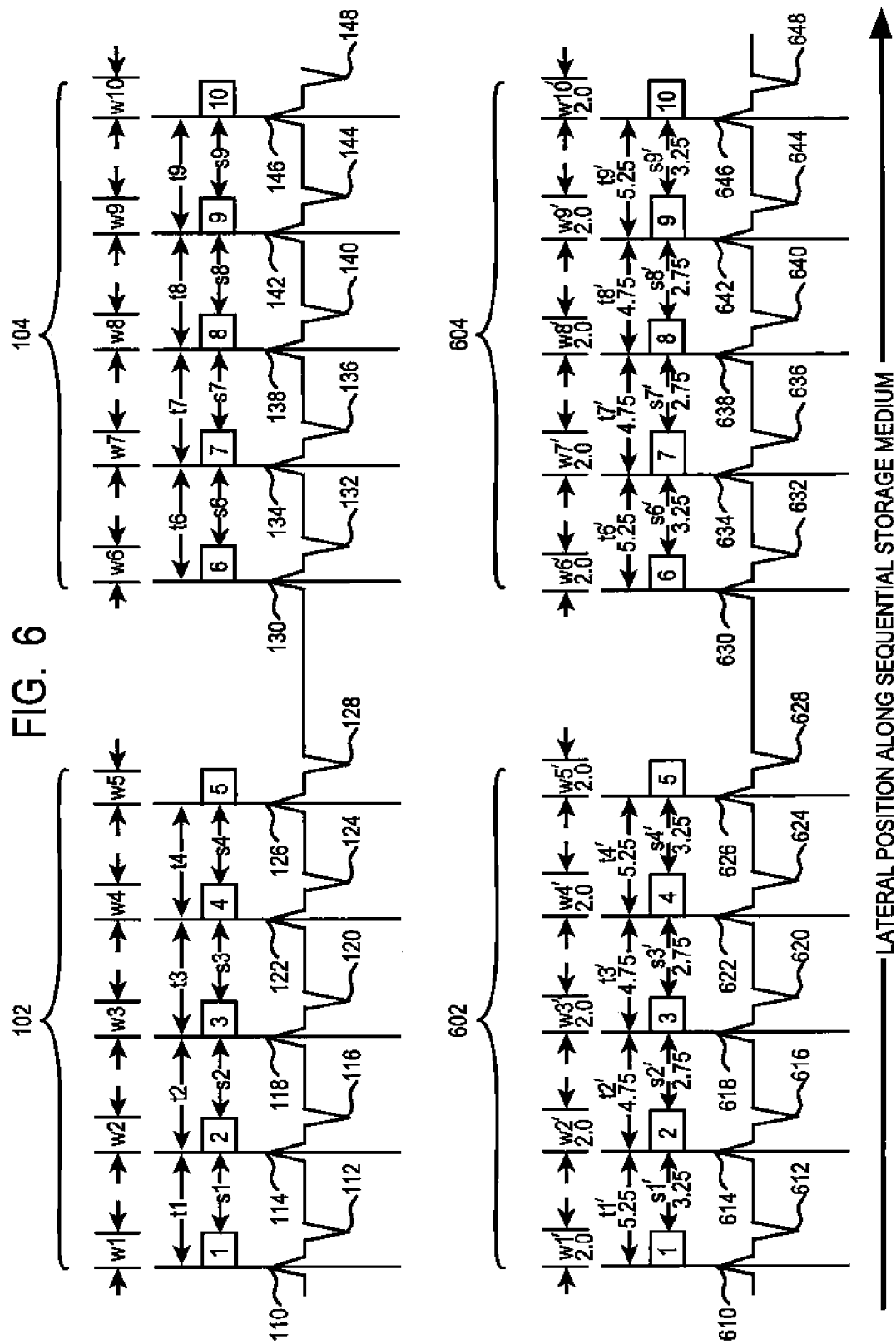
FIG. 6 illustrates Applicant's Subframe 1 architecture used to encode two bits of information having a value of "00"

FIG. 6 illustrates non-encoded bursts 102 and 104, and Applicant's servo bursts 602 and 604. Applicant's servo bursts 602 and 604 encode information having a value of "00". Referring now to FIG. 6, pulse 1 of burst 602 comprises a first magnetic phase shift 610, a second magnetic phase shift 612, and a width w1' between phase shifts 610 and 612. Pulse 2 of burst 602 comprises a third magnetic phase shift 614, a fourth magnetic phase shift 616, and a width w2' between phase shifts 614 and 616. A separation t1' separates first magnetic phase shift 610 and third magnetic phase shift 614. A separation s1' separates second magnetic phase shift 612 and third magnetic phase shift 614.

Pulse 3 of burst 602 comprises a fifth magnetic phase shift 618, a sixth magnetic phase shift 620, and a width w3' between phase shifts 618 and 620. A separation t2' separates third magnetic phase shift 614 and fifth magnetic phase shift 618. A separation s2' separates fourth magnetic phase shift 616 and fifth magnetic phase shift 618.

Pulse 4 of burst 602 comprises a seventh magnetic phase shift 622, an eighth magnetic phase shift 624, and a width w4' between phase shifts 622 and 624. A separation t3' separates fifth magnetic phase shift 618 and seventh magnetic phase shift 622. A separation s3' separates sixth magnetic phase shift 620 and seventh magnetic phase shift 622. Pulse 5 of burst 602 comprises a ninth magnetic phase shift 626, a tenth magnetic phase shift 628, and a width w5' between phase shifts 626 and 628. A separation t4' separates seventh magnetic phase shift 622 and ninth magnetic phase shift 626. A separation s4' separates eighth magnetic phase shift 624 and ninth magnetic phase shift 626.

Pulse 6 of burst 604 comprises an eleventh magnetic phase shift 630, a twelfth magnetic phase shift 632, and a width w6' between phase shifts 630 and 632. Pulse 7 of burst 604 comprises a thirteenth magnetic phase shift 634, a fourteenth magnetic phase shift 636, and a width w7' between phase shifts 634 and 636. A separation t6' separates eleventh magnetic phase shift 630 and thirteenth magnetic phase shift 634. A separation s6' separates twelfth magnetic phase shift 632 and thirteenth magnetic phase shift 634.

Pulse 8 of burst 604 comprises a fifteenth magnetic phase shift 638, a sixteenth magnetic phase shift 640, and a width w8' between phase shifts 638 and 640. A separation t7' separates thirteenth magnetic phase shift 634 and fifteenth magnetic phase shift 638. A separation s7' separates fourteenth magnetic phase shift 636 and fifteenth magnetic phase shift 638. Pulse 9 of burst 604 comprises a seventeenth magnetic phase shift 642, an eighteenth magnetic phase shift 644, and a width w9' between phase shifts 642 and 644. A separation t8' separates fifteenth magnetic phase shift 638 and seventeenth magnetic phase shift 642. A separation s8' separates sixteenth magnetic phase shift 640 and seventeenth magnetic phase shift 642.

Pulse 10 of burst 604 comprises a nineteenth magnetic phase shift 646, a twentieth magnetic phase shift 648, and a width w10' between phase shifts 646 and 648. A separation t9' separates seventeenth magnetic phase shift 642 and nineteenth magnetic phase shift 646. A separation s9' separates eighteenth magnetic phase shift 644 and nineteenth magnetic phase shift 646.

In the illustrated embodiment of FIG. 6, in bursts 602 and 604, w1'=w2'=w3'=w4'=w5'=w6'=w7'=w8'=w9'=w10'. In certain embodiments, in burst 602 and 604, w1'=w2'=w3'=w4'=w5'=w6'=w7' w8'=w9'=w10'=2.0 microns.

In certain embodiments, in burst 602 and 604, t1'=t4'=t6'=t9'. In certain embodiments, in burst 602 and 604, t1't4'=t6'=t9'=5.25 microns. In certain embodiments, in bursts 602 and 604, t2'=t3'=t7'=t8'. In certain embodiments, in bursts 602 and 604, d'=t3'=t7'=t8'=4.75 microns.

In certain embodiments, in bursts 602 and 604, s1'=s4'=s6'=s9'. In certain embodiments, in bursts 602 and 604, s1'=s4'=s6'=s9'=3.25 microns. In certain embodiments, in bursts 602 and 604, s2'=s3'=s7'=s8'. In certain embodiments, in bursts 602 and 604, s2'=s3'=s7'=s8'=2.75 microns.

Figure 7A:
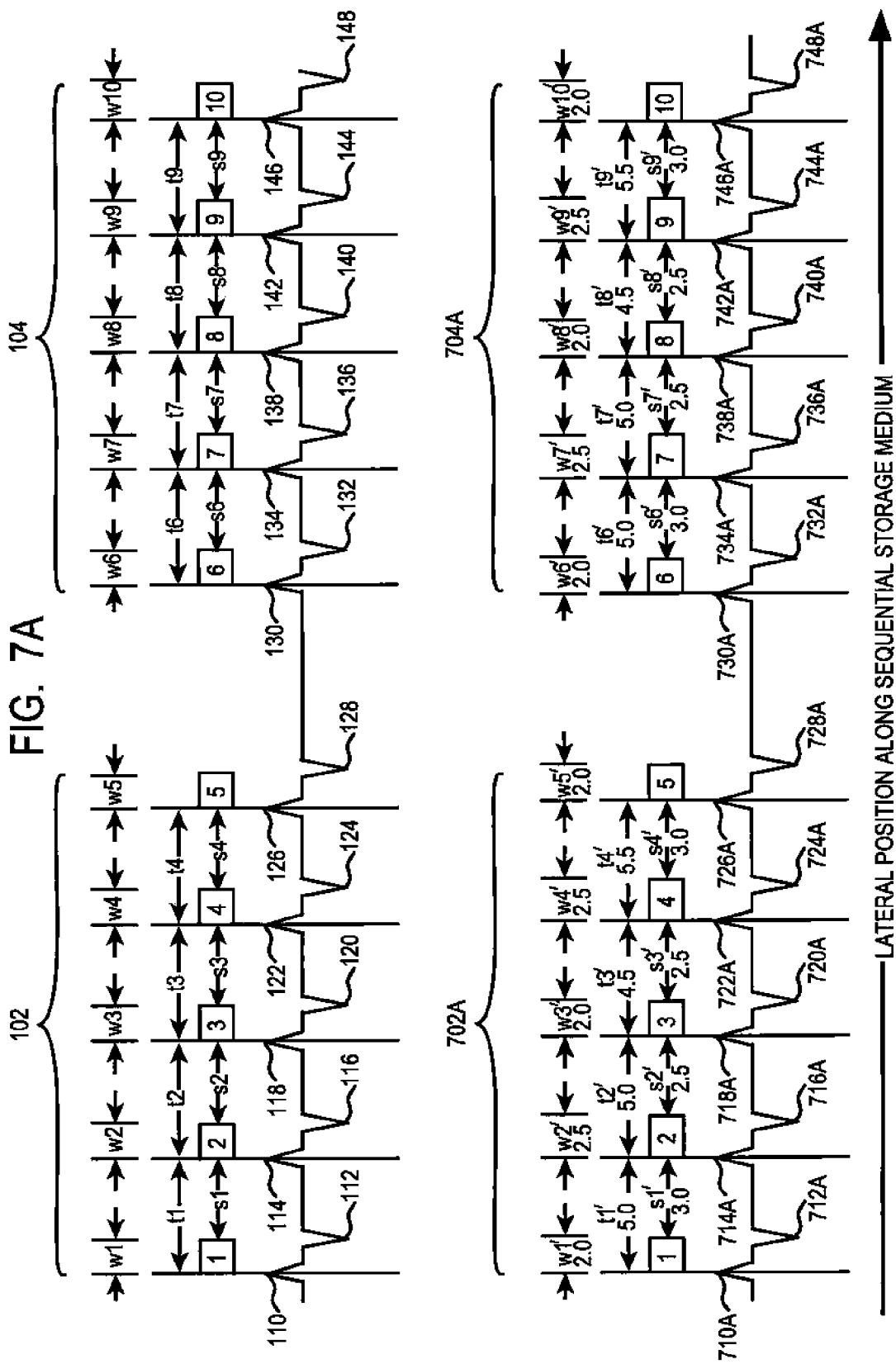
FIG. 7A illustrates a first embodiment of Applicant's Subframe 1 architecture used to encode two bits of information having a value of "01"

FIG. 7A illustrates non-encoded bursts 102 and 104, and Applicant's servo bursts 702A and 704A. Applicant's servo bursts 702A and 704A encode information having a value of "01". Referring now to FIG. 7A, pulse 1 of burst 702A comprises a first magnetic phase shift 710A, a second magnetic phase shift 712A, and a width w1' between phase shifts 710A and 712A. Pulse 2 of burst 702A comprises a third magnetic phase shift 714A, a fourth magnetic phase shift 716A, and a width w2' between phase shifts 714A and 716A. A separation t17 separates first magnetic phase shift 710A and third magnetic phase shift 714A. A separation s1' separates second magnetic phase shift 712A and third magnetic phase shift 714A.

Pulse 3 of burst 702A comprises a fifth magnetic phase shift 718A, a sixth magnetic phase shift 720A, and a width w3' between phase shifts 718A and 720A. A separation t2' separates third magnetic phase shift 714A and fifth magnetic phase shift 718A. A separation s2' separates fourth magnetic phase shift 716A and fifth magnetic phase shift 718A.

Pulse 4 of burst 702A comprises a seventh magnetic phase shift 722A, an eighth magnetic phase shift 724A, and a width w4' between phase shifts 722A and 724A. A separation t3' separates fifth magnetic phase shift 718A and seventh magnetic phase shift 722A. A separation s3' separates sixth magnetic phase shift 720A and seventh magnetic phase shift 722A. Pulse 5 of burst 702A comprises a ninth magnetic phase shift 726A, a tenth magnetic phase shift 728A, and a width w5' between phase shifts 726A and 728A. A separation t4' separates seventh magnetic phase shift 722A and ninth magnetic phase shift 726A. A separation s4' separates eighth magnetic phase shift 724A and ninth magnetic phase shift 726A.

Pulse 6 of burst 704A comprises an eleventh magnetic phase shift 730A, a twelfth magnetic phase shift 732A, and a width w6' between phase shifts 730A and 732A. Pulse 7 of burst 704A comprises a thirteenth magnetic phase shift 734A, a fourteenth magnetic phase shift 736A, and a width w7' between phase shifts 734A and 736A. A separation t6' separates eleventh magnetic phase shift 730A and thirteenth magnetic phase shift 734A. A separation s6' separates twelfth magnetic phase shift 732A and thirteenth magnetic phase shift 734A.

Pulse 8 of burst 704A comprises a fifteenth magnetic phase shift 738A, a sixteenth magnetic phase shift 740A, and a width w8' between phase shifts 738A and 740A. A separation t7' separates thirteenth magnetic phase shift 734A and fifteenth magnetic phase shift 738A. A separation s7' separates fourteenth magnetic phase shift 736A and fifteenth magnetic phase shift 738A. Pulse 9 of burst 704A comprises a seventeenth magnetic phase shift 742A, an eighteenth magnetic phase shift 744A, and a width w9' between phase shifts 742A and 744A. A separation t8' separates fifteenth magnetic phase shift 738A and seventeenth magnetic phase shift 742A. A separation s8' separates sixteenth magnetic phase shift 740A and seventeenth magnetic phase shift 742A.

Pulse 10 of burst 704A comprises a nineteenth magnetic phase shift 746A, a twentieth magnetic phase shift 748A, and a width w10' between phase shifts 746A and 748A. A separation t9' separates seventeenth magnetic phase shift 742A and nineteenth magnetic phase shift 746A. A separation s9' separates eighteenth magnetic phase shift 744A and nineteenth magnetic phase shift 746A.

In the illustrated embodiment of FIG. 7A, in bursts 702A and 704A, w1'=w3' w5'=w6'=w8'=w10'. In certain embodiments, in burst 702 and 704, w1' w3'=w5'=w6'=w8'=w10'=2.0 microns. In the illustrated embodiment of FIG. 7A, in bursts 702 and 704, w2'=w4'=w7'=w9'. In certain embodiments, in bursts 702A and 704A, w2'=w4'=w7'=w9'=2.5 microns.

In certain embodiments, in burst 702A and 704A, t1'=t2'=t6'=t7'. In certain embodiments, in burst 702A and 704A, t1'=t2'=t6'=t7'=5.0 microns. In certain embodiments, in bursts 702A and 704A, t3'=t8'. In certain embodiments, in bursts 702A and 704A, t3'=t8'=4.5 microns. In certain embodiments, in bursts 702A and 704A t4'=t9'. In certain embodiments, in bursts 702A and 704A, t4'=t9'=5.5 microns.

In certain embodiments, in bursts 702A and 704A, s1'=s4'=s6'=s9'. In certain embodiments, in bursts 702A and 704A, s1'=s4'=s6'=s9'=3.0 microns. In certain embodiments, in bursts 702A and 704A, s2'=s3'=s7'=s8'. In certain embodiments, in bursts 702A and 704A, s2'=s3'=s7'=s8'=2.5 microns.

Figure 7B:
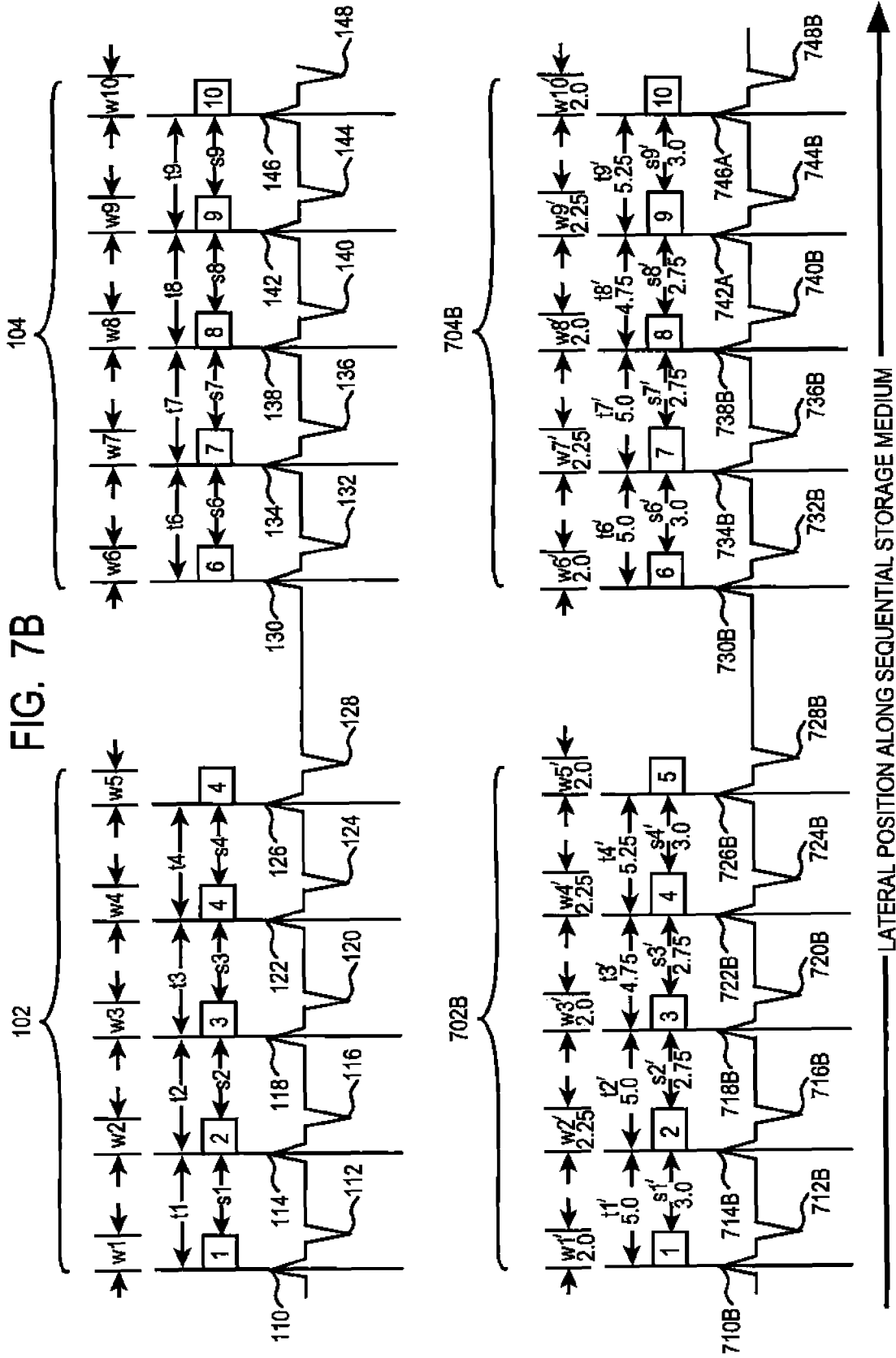
FIG. 7B illustrates a first embodiment of Applicant's Subframe 1 architecture used to encode two bits of information having a value of "01"

FIG. 7B illustrates non-encoded bursts 102 and 104, and Applicant's servo bursts 702B and 704B. Applicant's servo bursts 702B and 704B encode information having a value of "01". Referring now to FIG. 7B, pulse 1 of burst 702B comprises a first magnetic phase shift 710B, a second magnetic phase shift 712B, and a width w1' between phase shifts 710B and 712B. Pulse 2 of burst 702B comprises a third magnetic phase shift 714B, a fourth magnetic phase shift 716B, and a width w2' between phase shifts 714B and 716B. A separation t1' separates first magnetic phase shift 710B and third magnetic phase shift 714B. A separation s1' separates second magnetic phase shift 712B and third magnetic phase shift 714B.

Pulse 3 of burst 702B comprises a fifth magnetic phase shift 718B, a sixth magnetic phase shift 720B, and a width w3' between phase shifts 718B and 720B. A separation t2' separates third magnetic phase shift 714B and fifth magnetic phase shift 718B. A separation s2' separates fourth magnetic phase shift 716B and fifth magnetic phase shift 718B.

Pulse 4 of burst 702B comprises a seventh magnetic phase shift 722B, an eighth magnetic phase shift 724B, and a width w4' between phase shifts 722B and 724B. A separation t3' separates fifth magnetic phase shift 718B and seventh magnetic phase shift 722B. A separation s3' separates sixth magnetic phase shift 720B and seventh magnetic phase shift 722B. Pulse 5 of burst 702B comprises a ninth magnetic phase shift 726B, a tenth magnetic phase shift 728B, and a width w5' between phase shifts 726B and 728B. A separation t4' separates seventh magnetic phase shift 722B and ninth magnetic phase shift 726B. A separation s4' separates eighth magnetic phase shift 724B and ninth magnetic phase shift 726B.

Pulse 6 of burst 704B comprises an eleventh magnetic phase shift 730B, a twelfth magnetic phase shift 732B, and a width w6' between phase shifts 730B and 732B. Pulse 7 of burst 704B comprises a thirteenth magnetic phase shift 734B, a fourteenth magnetic phase shift 736B, and a width w7' between phase shifts 734B and 736B. A separation t6' separates eleventh magnetic phase shift 730B and thirteenth magnetic phase shift 734B. A separation s6' separates twelfth magnetic phase shift 732B and thirteenth magnetic phase shift 734B.

Pulse 8 of burst 704B comprises a fifteenth magnetic phase shift 738B, a sixteenth magnetic phase shift 740B, and a width w8' between phase shifts 738B and 740B. A separation t7' separates thirteenth magnetic phase shift 734B and fifteenth magnetic phase shift 738B. A separation s7' separates fourteenth magnetic phase shift 736B and fifteenth magnetic phase shift 738B. Pulse 9 of burst 704B comprises a seventeenth magnetic phase shift 742B, an eighteenth magnetic phase shift 744B, and a width w9' between phase shifts 742B and 744B. A separation t8' separates fifteenth magnetic phase shift 738B and seventeenth magnetic phase shift 742B. A separation s8' separates sixteenth magnetic phase shift 740B and seventeenth magnetic phase shift 742B.

Pulse 10 of burst 704B comprises a nineteenth magnetic phase shift 746B, a twentieth magnetic phase shift 748B, and a width w10' between phase shifts 746B and 748B. A separation t9' separates seventeenth magnetic phase shift 742B and nineteenth magnetic phase shift 746B. A separation s9' separates eighteenth magnetic phase shift 744B and nineteenth magnetic phase shift 746B.

In the illustrated embodiment of FIG. 7B, in bursts 702B and 704B, w1'=w3'=w5'=w6'=w8'=w10'. In certain embodiments, in burst 702B and 704B, w1'=w3'=w5'=w6'=w8'=w10'=2.0 microns. In the illustrated embodiment of FIG. 7B, in bursts 702B and 704B, w2'=w4'=w7'=w9'. In certain embodiments, in bursts 702B and 704B, w2'=w4'=w7'=w9'=2.25 microns.

In certain embodiments, in burst 702B and 704B, t1'=C'=t6'=t7'. In certain embodiments, in burst 702B and 704B, t1'=t2'=t6'=t7'=5.0 microns. In certain embodiments, in bursts 702B and 704B, t3'=t8'. In certain embodiments, in bursts 702B and 704, t3'=t8'=4.75 microns. In certain embodiments, in bursts 702B and 704B, t4'=t9'. In certain embodiments, in bursts 702B and 704B, t4'=t9'=5.25 microns.

In certain embodiments, in bursts 702B and 704B, s1'=s4'=s6'=s9'. In certain embodiments, in bursts 702B and 70B, s1'=s4'=s6'=s9'=3.0 microns. In certain embodiments, in bursts 702B and 704B, s2'=s3'=s7'=s8'. In certain embodiments, in bursts 702B and 704B, s2'=s3'=s7'=s8'=2.75 microns.

FIG. 8 illustrates non-encoded bursts 106 and 108, and Applicant's encoded servo bursts 806 and 808. Applicant's servo bursts 806 and 808, in combination, encode information having a value of "1". Referring now to FIG. 8, servo burst 806 comprises pulse 11, pulse 12, pulse 13, and pulse 14. Servo burst 808 comprises pulse 15, pulse 16, pulse 17, and pulse 18.

Pulse 11 of burst 806 comprises a first magnetic phase shift 850, a second magnetic phase shift 852, and a width w11' between phase shifts 850 and 852. Pulse 12 of burst 806 comprises a third magnetic phase shift 854, a fourth magnetic phase shift 856, and a width w12' between phase shifts 854 and 856. A separation t11' separates first magnetic phase shift 850 and third magnetic phase shift 854. A separation s11' separates second magnetic phase shift 852 and third magnetic phase shift 854.

Pulse 13 of burst 806 comprises a fifth magnetic phase shift 858, a sixth magnetic phase shift 860, and a width w13' between phase shifts 858 and 860. A separation t12' separates third magnetic phase shift 854 and fifth magnetic phase shift 858. A separation s12' separates fourth magnetic phase shift 856 and fifth magnetic phase shift 858.

Pulse 14 of burst 806 comprises a seventh magnetic phase shift 862, an eighth magnetic phase shift 864, and a width w14' between phase shifts 862 and 864. A separation t13' separates fifth magnetic phase shift 858 and seventh magnetic phase shift 862. A separation s13' separates sixth magnetic phase shift 860 and seventh magnetic phase shift 862.

Pulse 15 of burst 808 comprises a ninth magnetic phase shift 866, a tenth magnetic phase shift 868, and a width w15' between phase shifts 866 and 868. Pulse 16 of burst 808 comprises an eleventh magnetic phase shift 870, a twelfth magnetic phase shift 872, and a width w16' between phase shifts 870 and 872. A separation t15' separates ninth magnetic phase shift 866 and eleventh magnetic phase shift 870. A separation s15' separates tenth magnetic phase shift 868 and eleventh magnetic phase shift 870.

Pulse 17 of burst 808 comprises a thirteenth magnetic phase shift 874, a fourteenth magnetic phase shift 876, and a width w17' between phase shifts 874 and 876. A separation t16' separates eleventh magnetic phase shift 870 and thirteenth magnetic phase shift 874. A separation s16' separates twelfth magnetic phase shift 872 and thirteenth magnetic phase shift 874.

Pulse 18 of burst 808 comprises a fifteenth magnetic phase shift 878, a sixteenth magnetic phase shift 880, and a width w18' between phase shifts 878 and 880. A separation t17' separates thirteenth magnetic phase shift 874 and fifteenth magnetic phase shift 878. A separation s17' separates fourteenth magnetic phase shift 876 and fifteenth magnetic phase shift 878.

In the illustrated embodiment of FIG. 8, for bursts 806 and 808, w11'=w14'=w15'=w18', and w12'=w13'=w16'=w17'. In certain embodiments, for bursts 806 and 808, w11'=w14'=w15'=w18'=2.0 microns. In certain embodiments, for bursts 806 and 808, w12'=w13'=w16'=w17'=2.25 microns.

In the illustrated embodiment of FIG. 8, for bursts 806 and 808, t11'=t15', and t12'=t16', and t13'=t17'. In certain embodiments, for bursts 800 and 808, t11'=t15'=4.75 microns. In certain embodiments, for bursts 806 and 808, t12'=t16'=5.5 microns. In certain embodiments, for bursts 806 and 808, t13'=t17'=5.0 microns.

In the illustrated embodiment of FIG. 8, for bursts 806 and 808, s11'=s13'=s15'=s17', and s12'=s16'. In certain embodiments, for bursts &06 and 808, s11'=s13'=s15'=s17'=2.75 microns. In certain embodiments, for bursts 806 and 808, s12'=s16'=3.0 microns.

FIG. 9 illustrates non-encoded bursts 106 and 108, and Applicant's encoded servo bursts 906 and 908. Applicant's servo bursts 906 and 908, in combination, encode information having a value of "0". Referring now to FIG. 9, servo burst 906 comprises pulse 11, pulse 12, pulse 13, and pulse 14. Servo burst 908 comprises pulse 15, pulse 16, pulse 17, and pulse 18.

Pulse 11 of burst 906 comprises a first magnetic phase shift 950, a second magnetic phase shift 952, and a width w11' between phase shifts 950 and 952. Pulse 12 of burst 906 comprises a third magnetic phase shift 954, a fourth magnetic phase shift 956, and a width w12' between phase shifts 954 and 956. A separation t11' separates first magnetic phase shift 950 and third magnetic phase shift 954. A separation s11' separates second magnetic phase shift 952 and third magnetic phase shift 954.

Pulse 13 of burst 906 comprises a fifth magnetic phase shift 958, a sixth magnetic phase shift 960, and a width w13' between phase shifts 958 and 960. A separation t12' separates third magnetic phase shift 954 and fifth magnetic phase shift 958. A separation s12' separates fourth magnetic phase shift 956 and fifth magnetic phase shift 958.

Pulse 14 of burst 906 comprises a seventh magnetic phase shift 962, an eighth magnetic phase shift 964, and a width w14' between phase shifts 962 and 964. A separation t13' separates fifth magnetic phase shift 958 and seventh magnetic phase shift 962. A separation s13' separates sixth magnetic phase shift 960 and seventh magnetic phase shift 962.

Pulse 15 of burst 908 comprises a ninth magnetic phase shift 966, a tenth magnetic phase shift 968, and a width w15' between phase shifts 966 and 968. Pulse 16 of burst 908 comprises an eleventh magnetic phase shift 970, a twelfth magnetic phase shift 972, and a width w16' between phase shifts 970 and 972. A separation t15' separates ninth magnetic phase shift 966 and eleventh magnetic phase shift 970. A separation s15' separates tenth magnetic phase shift 968 and eleventh magnetic phase shift 970.

Pulse 17 of burst 908 comprises a thirteenth magnetic phase shift 974, a fourteenth magnetic phase shift 976, and a width w17' between phase shifts 974 and 976. A separation t16' separates eleventh magnetic phase shift 970 and thirteenth magnetic phase shift 974. A separation s16' separates twelfth magnetic phase shift 972 and thirteenth magnetic phase shift 974.

Pulse 18 of burst 908 comprises a fifteenth magnetic phase shift 978, a sixteenth magnetic phase shift 980, and a width w18' between phase shifts 978 and 980. A separation t17' separates thirteenth magnetic phase shift 974 and fifteenth magnetic phase shift 978. A separation s17' separates fourteenth magnetic phase shift 976 and fifteenth magnetic phase shift 978.

In the illustrated embodiment of FIG. 9, for bursts 906 and 908, w11'=w12'=w13'=w14'=w15' w16'=w17'=w18'. In certain embodiments, for bursts 906 and 903, w11' w12'=w13'=w14'=w15'=w16'=w17'=w13'=2.0 microns.

In the illustrated embodiment of FIG. 9, for bursts 806 and 808, t11'=t13'=t15'=t17', and t12'=t16'. In certain embodiments, for bursts 906 and 908, t11'=t13'=t15'=t17'=4.75 microns. In certain embodiments, for bursts 806 and 808, t12'=t16'=5.5 microns.

In the illustrated embodiment of FIG. 9, for bursts 906 and 908, s11'=s13'=s15'=s17', and s12'=s16'. In certain embodiments, for bursts 806 and 808, s11'=s13'=s15'=s17'=2.75 microns. In certain embodiments, for bursts 806 and 808, s12'=s16'=3.5 microns.

Table 1 summarizes the information that can be encoded in each 4 burst servo pattern using prior art methods.

TABLE 1

PRIOR ART

| SUBFRAME 1 | SUBFRAME 2 | ENCODED INFORMATION |
|---|---|---|
| 102, 104 | 106, 108 | NONE |
| 202, 204 | 106, 108 | 1 |
| 302, 304 | 106, 108 | 0 |

Using an unencoded Sub frame 1 architecture described hereinabove in combination with Applicants' Subframe 2 architecture, Applicant's method can encode 1 bit of information in each servo pattern written to a sequential storage medium. Table 2 summarizes the information that can be encoded in each four burst servo pattern using this embodiment of Applicant's method.

TABLE 2

ENCODING 1 BIT PER SERVO PATTERN

| SUBFRAME 1 | SUBFRAME 2 | ENCODED INFORMATION |
| --- | --- | --- |
| 102, 104 | 806, 808 | 1 |
| 102, 104 | 906, 908 | 0 |

Using Applicant's Subframe 1 architecture described hereinabove in combination with the prior art Subframe 2 architecture, Applicant's method can encode 2 bits of information in each servo pattern written to a sequential storage medium. Table 3 summarizes the information that can be encoded in each four burst servo pattern using this embodiment of Applicant's method.

TABLE 3

ENCODING 2 BITS PER SERVO PATTERN

| SUBFRAME 1 | SUBFRAME 2 | ENCODED INFORMATION |
| --- | --- | --- |
| 402A, 404A | 106, 108 | 10 |
| 402B, 402B | 106, 108 | 10 |
| 502A, 504A | 106, 108 | 11 |
| 502B, 504B | 106, 108 | 11 |
| 602, 604 | 106, 108 | 00 |
| 702A, 704A | 106, 108 | 01 |
| 702B, 704B | 106, 108 | 01 |

Using Applicant's Subframe 1 architecture described hereinabove in combination with Applicant's Subframe 2 architecture described hereinabove, Applicant's method can encode 3 bits of information in each servo pattern written to a sequential storage medium. Table 4 summarizes the information that can be encoded in each 4 burst servo pattern using this embodiment of Applicant's method.

TABLE 4

ENCODING 3 BITS PER SERVO PATTERN

| SUBFRAME 1 | SUBFRAME 2 | ENCODED INFORMATION |
| --- | --- | --- |
| 402A, 404A | 806, 808 | 101 |
| 402B, 404B | 806, 808 | 101 |
| 502A, 504A | 806, 808 | 111 |
| 502B, 504B | 806, 808 | 111 |
| 602, 604 | 806, 808 | 001 |
| 702A, 704A | 806, 808 | 011 |
| 702B, 704B | 806, 808 | 011 |
| 402A, 404A | 906, 908 | 100 |
| 402B, 404B | 906, 908 | 100 |
| 502A, 504A | 906, 908 | 110 |
| 502B, 504B | 906, 908 | 110 |
| 602, 604 | 906, 908 | 000 |
| 702A, 704A | 906, 908 | 010 |
| 702B, 704B | 906, 908 | 010 |

In certain embodiments, Applicant's sequential information storage medium comprises a plurality of servo patterns encoded sequentially along its length. In certain embodiments, Applicant's method aggregates the information encoded in a sequential plurality of servo patterns to form one or more words. In certain embodiments, Applicant's method aggregates the information encoded in 36 sequential servo patterns to form three words, wherein the information encoded in four sequential servo patterns comprises manufacturer information, and wherein the information encoded in eight sequential servo patterns comprises sync information, and wherein the information encoded in twenty-four (24) sequential servo patterns comprises LPOS information.

Using the prior art servo patterns of Table 1, the four sequential servo patters which in combination are used to encode manufacturer information comprise, in the aggregate, 4 bits of information. Using Applicant's servo patterns of Table 2, the four sequential servo patterns which in combination are used to encode manufacturer information comprise, in the aggregate, 8 bits of information. As those skilled in the art will appreciate, use of Applicant's servo patterns of Table 2 allows the encoding of two times the amount of manufacturer information as does use of prior art servo patterns. As those skilled in the art will further appreciate, use of Applicant's servo patterns of Table 2 allows a higher reliability in the decoding of manufacturer information as compared to the use of prior art servo patterns.

Using Applicant's servo patterns of Table 3, the four sequential servo patterns which in combination are used to encode manufacturer information comprise, in the aggregate, 12 bits of information. As those skilled in the art will appreciate, use of Applicant's servo patterns of Table 3 allows the encoding of three tines the amount of manufacturer information as does use of prior art servo patterns. As those skilled in the art will appreciate, use of Applicant's servo patterns of Table 3 allows a higher reliability in the decoding of manufacturer information as compared to the use of prior art servo patterns.

Using the prior art servo patterns of Table 1, the eight sequential servo patterns which in combination are used to encode sync information comprise, in the aggregate, 8 bits of information. Using Applicant's servo patterns of Table 2, the eight sequential servo patterns which in combination are used to encode sync information comprise, in the aggregate, 16 bits. As those skilled in the art will appreciate, use of Applicant's servo patterns of Table 2 allows the encoding of two times the amount of sync information as does use of prior art servo patterns. As those skilled in the art will further appreciate, use of Applicant's servo patterns of Table 3 allows the encoding of three times the amount of sync information as does use of prior art servo patterns.

Using the prior art servo patterns of Table 1, the 24 sequential servo patterns which in combination are used to encode LPOS information comprise, in the aggregate, 24 bits of information. Using Applicant's servo patterns of Table 2, Applicant's sequential 24 servo patterns used to encode LPOS information comprise, in the aggregate, 48 bits of information. Using Applicant's servo patterns of Table 3, Applicant's sequential 24 servo patterns used to encode LPOS information comprise, in the aggregate, 72 bits of information. As those skilled in the art will appreciate, use of Applicant's servo patterns of Table 2 or Table 3 allows a higher reliability in the decoding of LPOS information as compared to the use of prior art servo patterns.

Applicant's invention fiber comprises an article of manufacture, such as and without limitation a tape drive apparatus, a data storage controller, an automated data storage library, a host computing device comprising a storage management program and in communication with a data storage library, wherein that article of manufacture comprises a computer readable medium comprising computer readable program code comprising a series of computer readable program steps to effect encoding a plurality of Applicant's servo patterns in one or more non-data regions of a sequential information storage medium, and/or decoding information encoded in a plurality of Applicant's servo patterns of Table 2 and/or Table 3.

Applicant's invention further includes a computer program product encoded in a computer readable medium and usable with a computer processor to encode a plurality of Applicant's servo patterns in one or more non-data regions of a sequential information storage medium, and/or decode information encoded in a plurality of Applicant's servo patterns of Table 2 and/or Table 3.

While the preferred embodiments of the present invention have been illustrated in detail, it should be apparent that modifications and adaptations to those embodiments may occur to one skilled in the art without departing from the scope of the present invention as set forth in the following claims.

I claim:

1. A sequential data storage medium, comprising a sequence of a plurality of servo patterns encoded in a non-data region, wherein each of said servo patterns comprises:
   a first burst comprising a first pulse, a second pulse, a third pulse, a fourth pulse and a fifth pulse;
   a second burst comprising a sixth pulse, a seventh pulse, an eighth pulse, a ninth pulse and a tenth pulse;
   wherein:
   the widths of said plurality of pulses, in combination with the spacings between said plurality of pulses, encode two bits of data;
   said first pulse comprises a first magnetic phase shift and a second magnetic phase shift;
   said second pulse comprises a third magnetic phase shift and a fourth magnetic phase shift;
   said third pulse comprises a fifth magnetic phase shift and a sixth magnetic phase shift;
   said fourth pulse comprises a seventh magnetic phase shift and an eighth magnetic phase shift;
   said fifth pulse comprises a ninth magnetic phase shift and a tenth magnetic phase shift;
   said sixth pulse comprises an eleventh magnetic phase shift and a twelfth magnetic phase shift;
   said seventh pulse comprises a thirteenth magnetic phase shift and a fourteenth magnetic phase shift;
   said eighth pulse comprises a fifteenth magnetic phase shift and a sixteenth magnetic phase shift;
   said ninth pulse comprises a seventeenth magnetic phase shift and an eighteenth magnetic phase shift; and
   said tenth pulse comprises a nineteenth magnetic phase shift and a twentieth magnetic phase shift;
   said first magnetic phase shift and said third phase shift are separated by a first separation;
   said third magnetic phase shift and said fifth phase shift are separated by a second separation;
   said fifth magnetic phase shift and said seventh phase shift are separated by a third separation;
   said seventh magnetic phase shift and said ninth phase shift are separated by a fourth separation;
   said eleventh magnetic phase shift and said thirteenth phase shift are separated by a sixth separation;
   said thirteenth magnetic phase shift and said fifteenth phase shift are separated by a seventh separation;
   said fifteenth magnetic phase shift and said seventeenth phase shift are separated by a eighth separation;
   said seventeenth magnetic phase shift and said nineteenth phase shift are separated by an ninth separation;
   wherein for a first servo pattern:
   said first separation, said third separation, said sixth separation, and said eighth separation, are equal in length;
   said second separation, said fourth separation, said seventh separation, and said ninth separation, are equal in length;
   said first servo pattern encodes a value "10".

2. The sequential data storage medium of claim 1, wherein for said first servo pattern:
   said first separation, said third separation, said sixth separation, and said eighth separation, equal 4.75 microns;
   said second separation, said fourth separation, said seventh separation, and said ninth separation, equal 5.25 microns.

3. The sequential data storage medium of claim 1, wherein for said first servo pattern:
   said first pulse comprises a first width;
   said second pulse comprises a second width;
   said third pulse comprises said first width;
   said fourth pulse comprises said second width;
   said fifth pulse comprises said first width;
   said sixth pulse comprises said first width;
   said seventh pulse comprises said second width;
   said eighth pulse comprises said first width;
   said ninth pulse comprises said second width;
   said tenth pulse comprises said first width;
   wherein said second width is greater than said first width.

4. The sequential data storage medium of claim 1, wherein for a second servo pattern:
   said first separation, said second separation, said sixth separation, and said seventh separation, are equal;
   said third separation, and said eighth separation, are equal;
   said fourth separation and said ninth separation, are equal;
   said second servo pattern encodes a value "01".

5. The sequential data storage medium of claim 4, wherein for said second servo pattern:
   said first separation, said second separation, said sixth separation, and said seventh separation, equal 5.0 microns;
   said third separation, and said eighth separation, equal 4.5 microns; and
   said fourth separation and said ninth separation, equal 5.5 microns.

6. The sequential data storage medium of claim 4, wherein for said second servo pattern:
   said first pulse comprises a first width;
   said second pulse comprises a second width;
   said third pulse comprises said first width;
   said fourth pulse comprises said second width
   said fifth pulse comprises said first width;
   said sixth pulse comprises said first width;
   said seventh pulse comprises said second width;
   said eighth pulse comprises said first width;
   said ninth pulse comprises said second width;
   said tenth pulse comprises said first width;
   wherein said second width is greater than said first width.

7. The sequential data storage medium of claim 1, wherein for a third servo pattern:
   said first separation, said fourth separation, said sixth separation, and said ninth separation, are equal in length to 4.75 microns;
   said second separation, said third separation, said seventh separation, and said eighth separation, are equal in length to 5.25 microns; and
   said second servo pattern encodes a value "11".

8. The sequential data storage medium of claim 1, wherein for a fourth servo pattern:
   said first separation, said fourth separation, said sixth separation, and said ninth separation, are equal in length to 5.25 microns;
   said second separation, said third separation, said seventh separation, and said eighth separation, are equal in length to 4.75 microns; and
   said second servo pattern encodes a value "00".

* * * * *